(12) United States Patent
Usami et al.

(10) Patent No.: US 6,473,196 B2
(45) Date of Patent: *Oct. 29, 2002

(54) IMAGE FORMING APPARATUS AND METHOD

(75) Inventors: Akihiro Usami; Makoto Takaoka; Masahiro Funada, all of Yokohama; Shigeo Fukuoka, Machida; Rieko Akiba, Shizuoka-ken; Tomotoshi Kanatsu, Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,368

(22) Filed: Sep. 16, 1997

(65) Prior Publication Data

US 2001/0013938 A1 Aug. 16, 2001

(30) Foreign Application Priority Data

Sep. 19, 1996 (JP) .............................. 8-247964
Sep. 19, 1996 (JP) .............................. 8-247967
Sep. 25, 1996 (JP) .............................. 8-253015

(51) Int. Cl.$^7$ .......................... G06K 15/02; H04N 1/21; H04N 1/387; H04N 1/393

(52) U.S. Cl. ..................... 358/1.18; 358/1.16; 358/444; 358/450; 358/1.2; 358/451

(58) Field of Search .............................. 395/109, 102, 395/111, 112, 113, 115, 116, 117; 397/401, 402; 358/421, 1.18, 1.16, 1.2, 450–451, 449, 444; 382/173, 181, 182, 185, 189, 199, 232, 293, 296, 297, 305; 399/410

(56) References Cited

U.S. PATENT DOCUMENTS

| | | | |
|---|---|---|---|
| 4,763,167 A | * 8/1988 | Watanabe et al. | 399/410 |
| 4,905,054 A | 2/1990 | Rood | |
| 5,077,811 A | 12/1991 | Onda | |
| 5,105,283 A | * 4/1992 | Forest et al. | 358/450 |

(List continued on next page.)

FOREIGN PATENT DOCUMENTS

| | | |
|---|---|---|
| GB | 2 264 560 | 9/1993 |
| JP | 60-153666 | 8/1985 |

OTHER PUBLICATIONS

U.S. patent application Ser. No. 08/547,271, Sato et al., filed Oct. 25, 1995, (5,930,001) Canon Kabushiki Kaisha.
U.S. patent application Ser. No. 08/881,274, Funada et al., filed Jun. 24, 1997, (6,041,205) Canon Kabushiki Kaisha.

Primary Examiner—Scott Rogers
(74) Attorney, Agent, or Firm—Fitzpatrick, Cella, Harper & Scinto

(57) ABSTRACT

A user designates a two-sided copying mode, a reduced-scale copying mode, a vertical or horizontal binding direction, and the like from a control panel. An original image is magnification-varied at a designated reduction magnification, and the reduced image is stored in a page memory. In the case of an odd page (front surface) in a single-sided or two-sided copying mode, a γ conversion circuit reads out and outputs stored image data in the normal order, thus forming images. On the other hand, in the case of an even page (back page) in the two-sided copying mode, whether the horizontal or vertical binding direction is designated is checked. If the binding direction agrees with the reversing axis direction of a paper sheet upon copying, images are read out in the normal order. When the vertical binding direction is designated, images are read out in an order opposite to the normal order, so that each page is rotated through 180°. Images are copied in the designated layout.

25 Claims, 43 Drawing Sheets

U.S. PATENT DOCUMENTS

| | | | |
|---|---|---|---|
| 5,204,946 A | * 4/1993 | Shimamura | 358/462 |
| 5,343,304 A | 8/1994 | Nakai et al. | |
| 5,440,403 A | * 8/1995 | Hashimoto et al. | 358/450 |
| 5,475,475 A | * 12/1995 | Kohtani et al. | 358/296 |
| 5,483,354 A | * 1/1996 | Kessels et al. | 358/300 |
| 5,508,810 A | * 4/1996 | Sato | 358/296 |
| 5,565,964 A | * 10/1996 | Tashiro et al. | 358/425 |
| 5,625,466 A | * 4/1997 | Nakajima | 358/449 |
| 5,638,181 A | * 6/1997 | Kubo et al. | 358/296 |
| 5,649,033 A | * 7/1997 | Morikawa et al. | 382/297 |
| 5,664,027 A | * 9/1997 | Ittner | 382/170 |
| 5,680,198 A | * 10/1997 | Ohnishi | 358/296 |
| 5,867,279 A | * 2/1999 | Funamizu et al. | 382/296 |
| 6,144,777 A | * 11/2000 | Tada et al. | 382/284 |

* cited by examiner

FIG. 1A
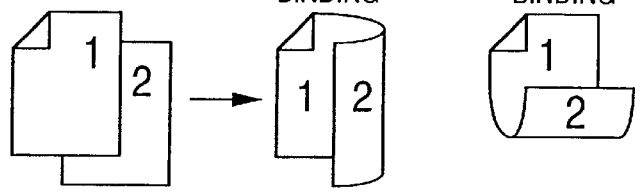
FIG. 1B
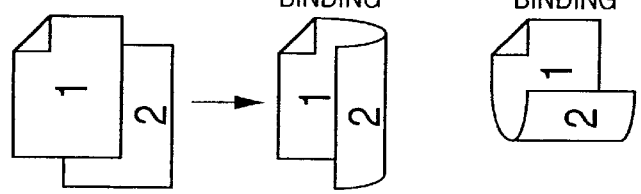
FIG. 1C
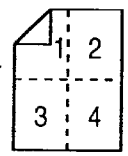 FOR HORIZONTAL WRITING
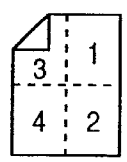 FOR VERTICAL WRITING
FIG. 1D
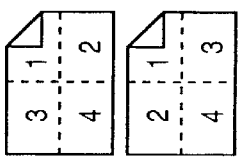 FOR VERTICAL WRITING
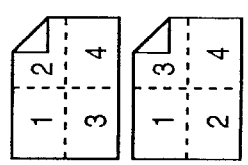 FOR HORIZONTAL WRITING

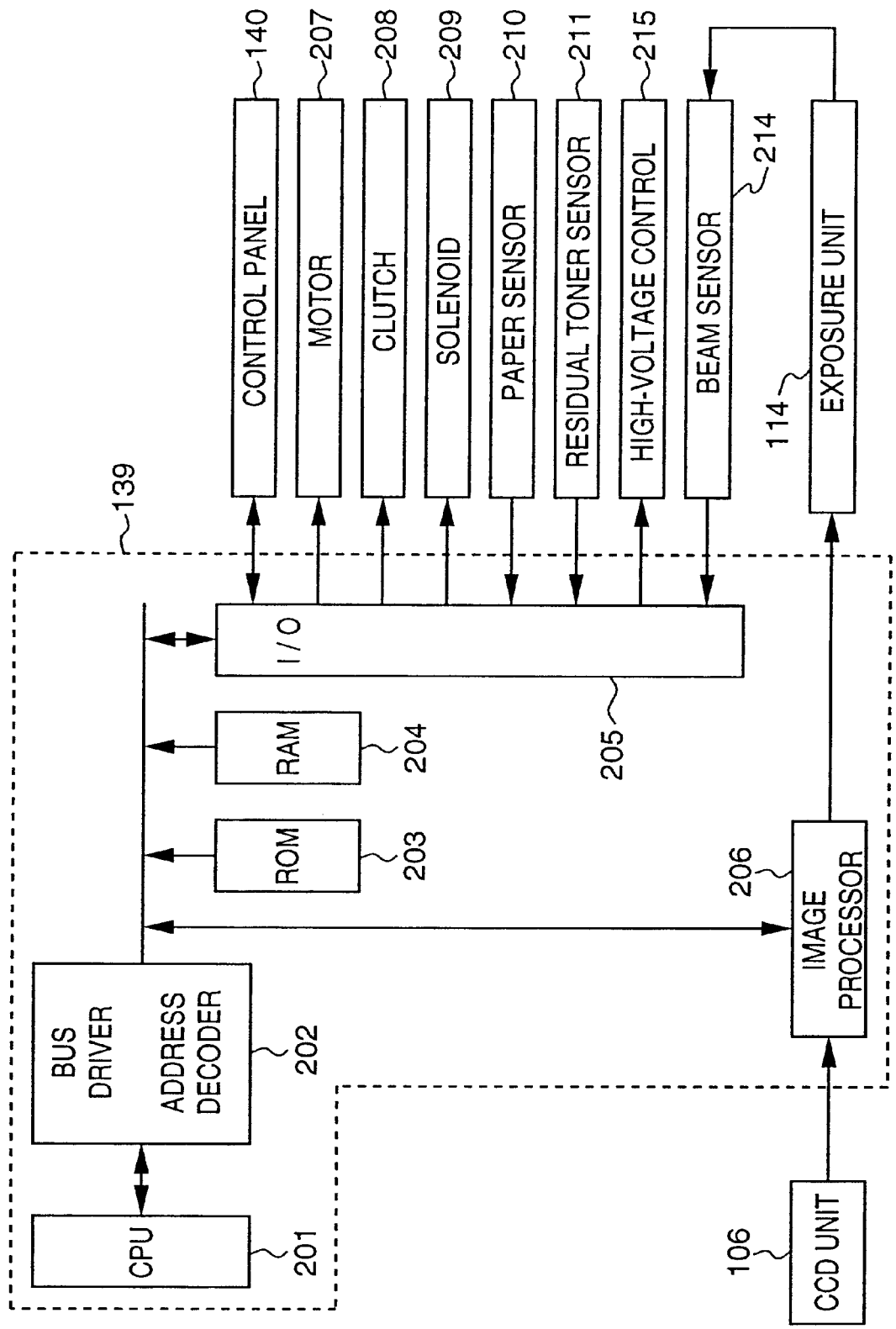

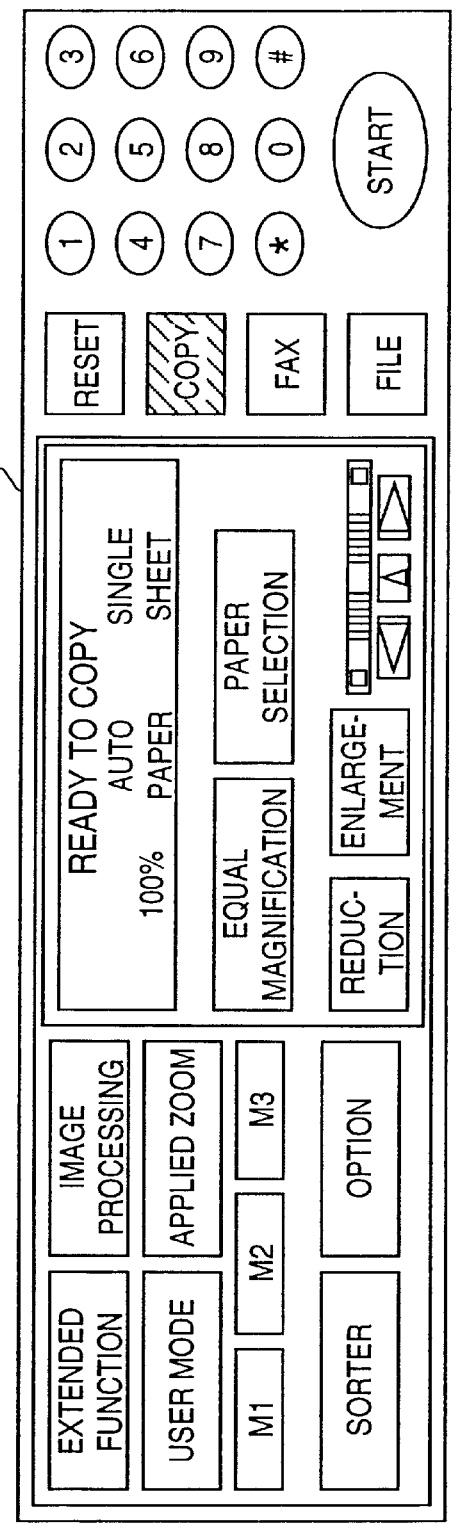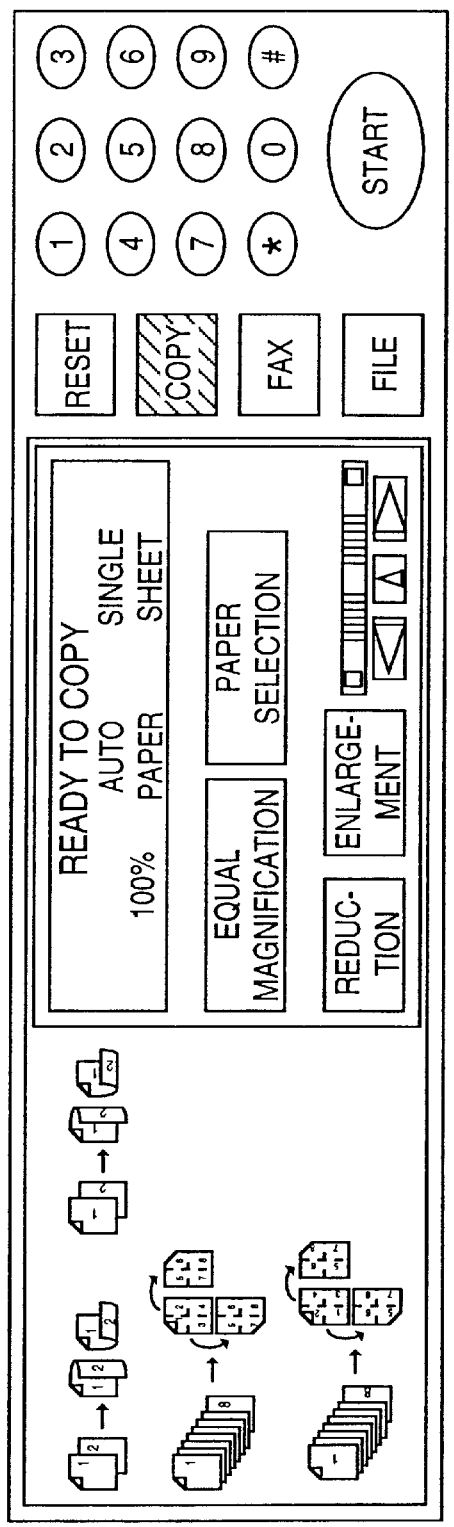

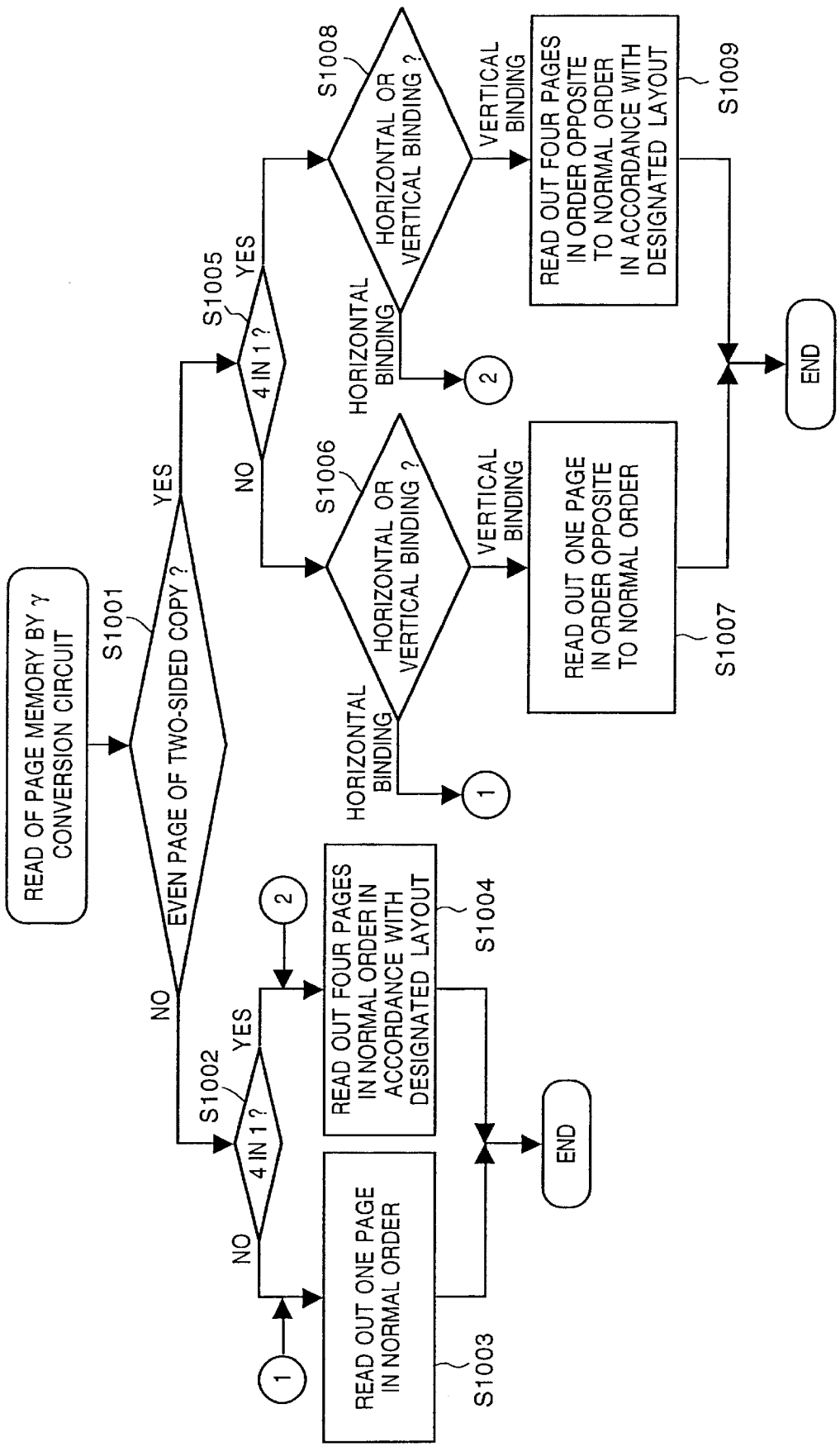

F I G. 14C
1. 本発明の名称
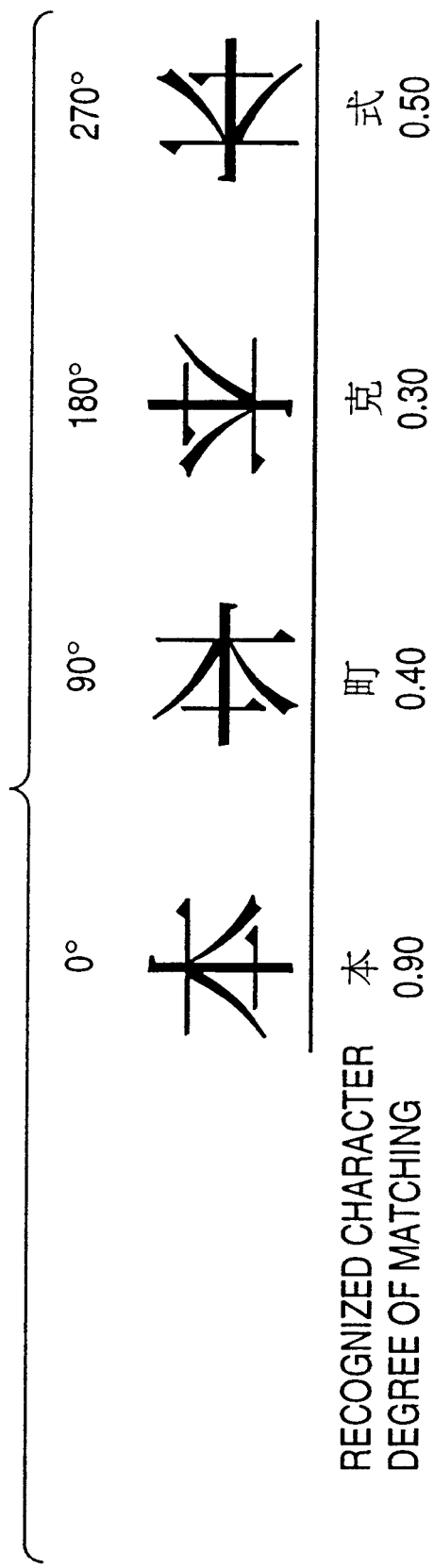
F I G. 14D

FIG. 19A
DIRECTION OF ORIGINAL PLACED ON PLATEN
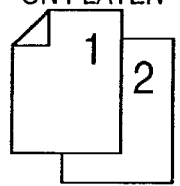
COPY OUTPUT LEFT BINDING
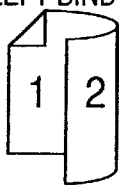
FIG. 19B
DIRECTION OF ORIGINAL PLACED ON PLATEN
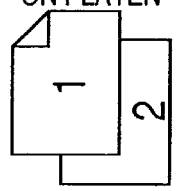
COPY OUTPUT LEFT BINDING
FIG. 19C
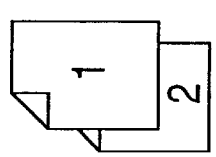
TOP BINDING
FIG. 19D
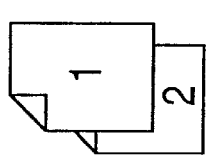
TOP BINDING
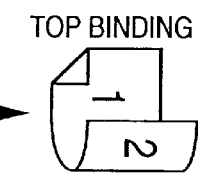
FIG. 19E
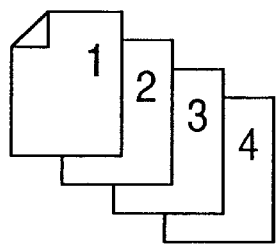
HORIZONTAL BINDING
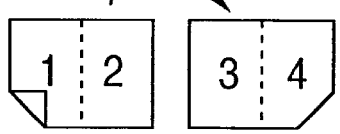
FIG. 19F
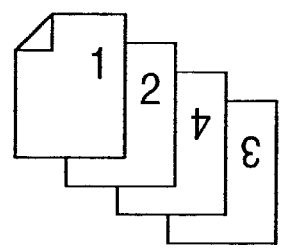
VERTICAL BINDING
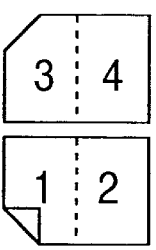

FIG. 24
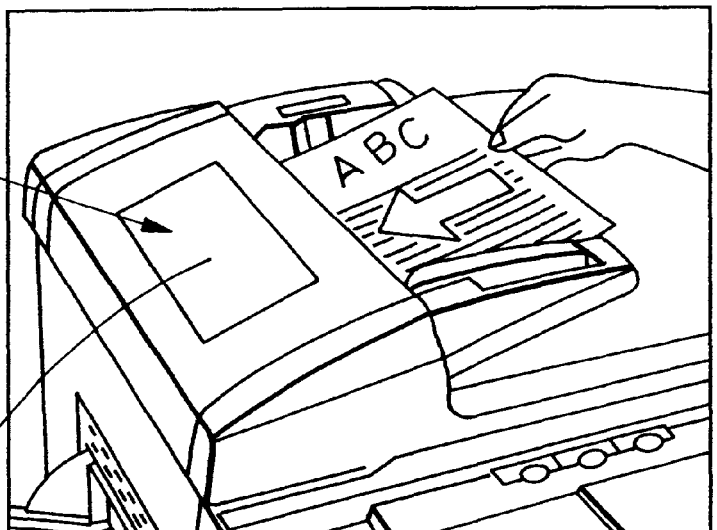
DISPLAY EXAMPLE OF PRESENT INVENTION
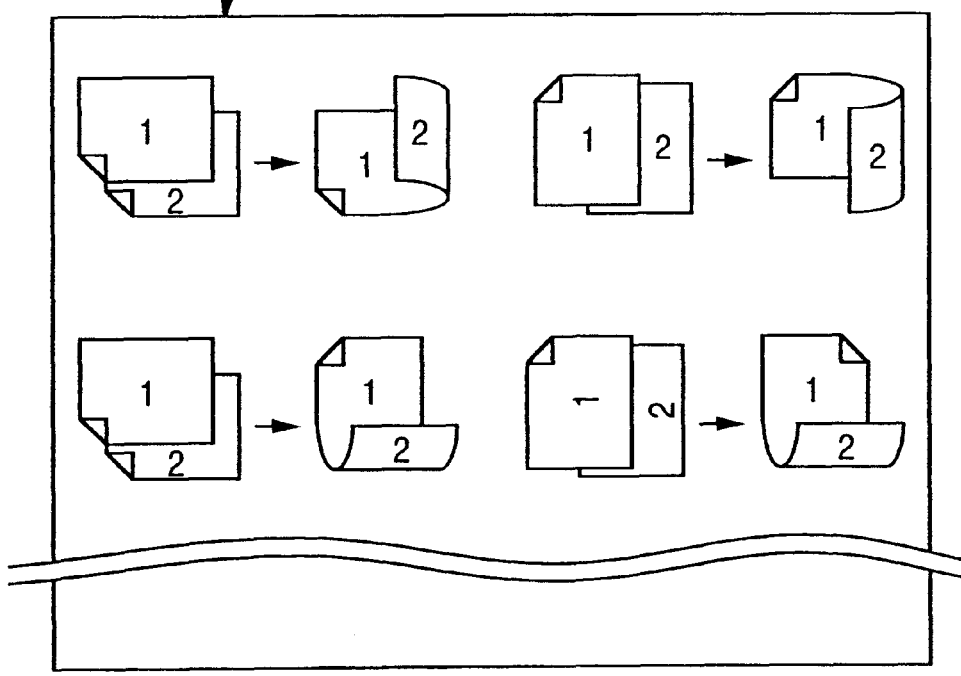

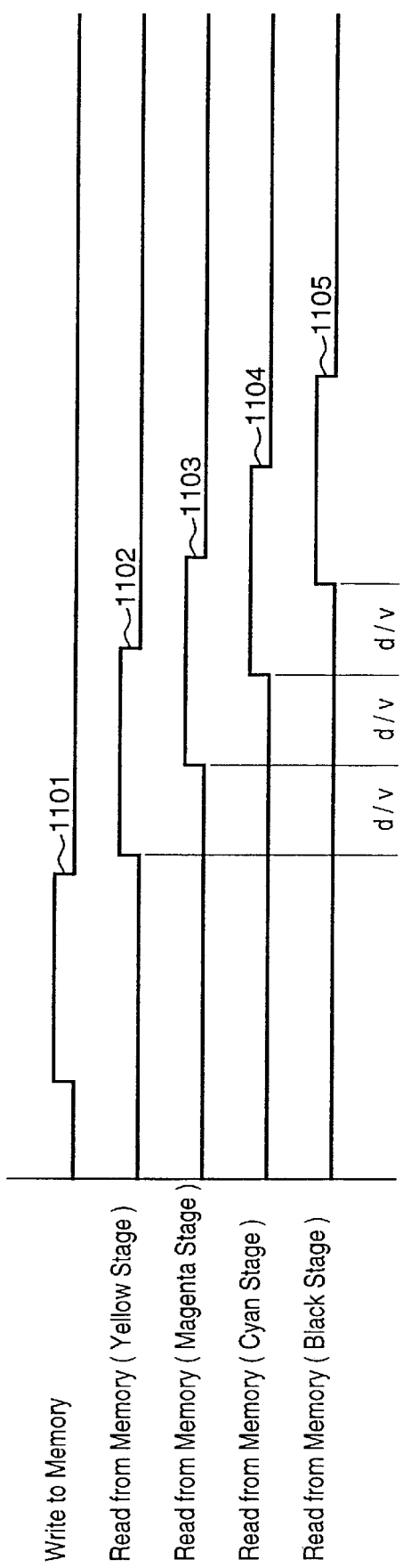
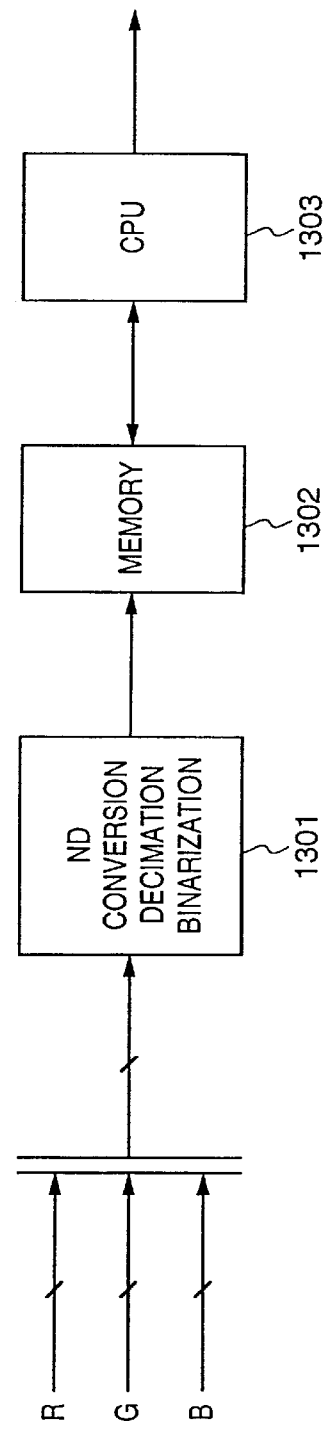

FIG. 39
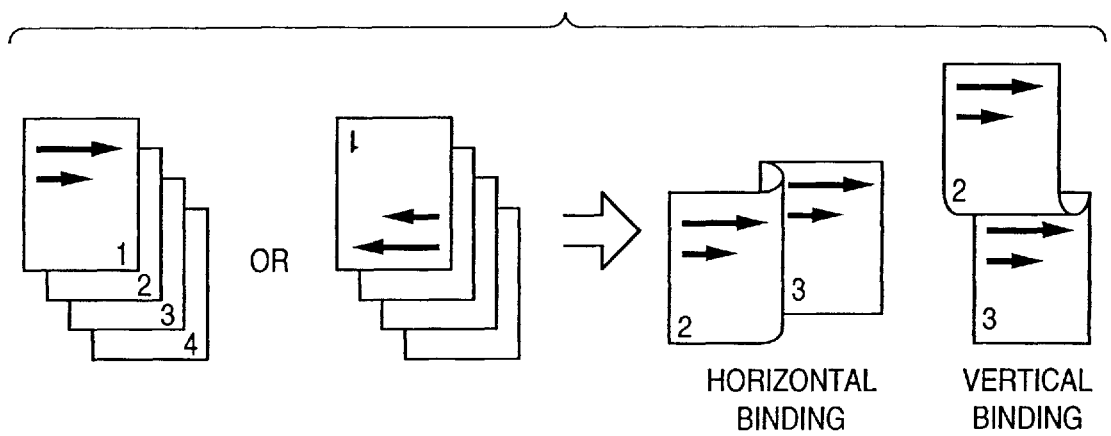
HORIZONTAL BINDING  VERTICAL BINDING
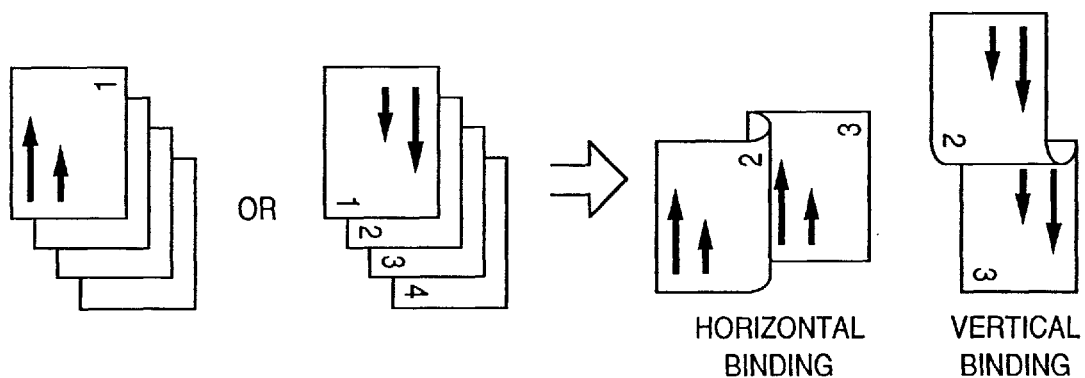
HORIZONTAL BINDING  VERTICAL BINDING

FIG. 41

TEXT REGION

テキストブロックを見て行う方向簡易手法としてまず考えられるのは、テキスト中の文字が何の文字であるかを理解した上で、その方向を判別する手法であろう。この手法は人間の方向察知プロセスとも一致していると考えられ、文字ＡＢＣＤをＥいれば、ＦＧＨＩでも次のようなアルブリズムでＪＫすることが出来る。

テキストブロック中から文字ＬＭをとりだしてそれぞれ０、９０、１８０、２７０度回転した４ＮＯの角度を作成。それぞれを文字ＰＱしても最も文字らしい結果が出た方向を元テキストの方向とする。

方向判別に用いる文字数を十分にとりことが出来れば、現場Ｒ別文字ＳＴのＵＶＷとＸＹの高い方法判別ＺＡをＢることがＣＤできる。

しかし本レポートでは、そのような文字ＥＦを用いないことをＧＨとし、ＩＪなＫＬＭＮのみによってテキストブロックからＯられる特徴を使って方向判別を行うアルゴリズムのＰＱを行った。

RECTANGLE CIRCUMSCRIBING CHARACTER LINE

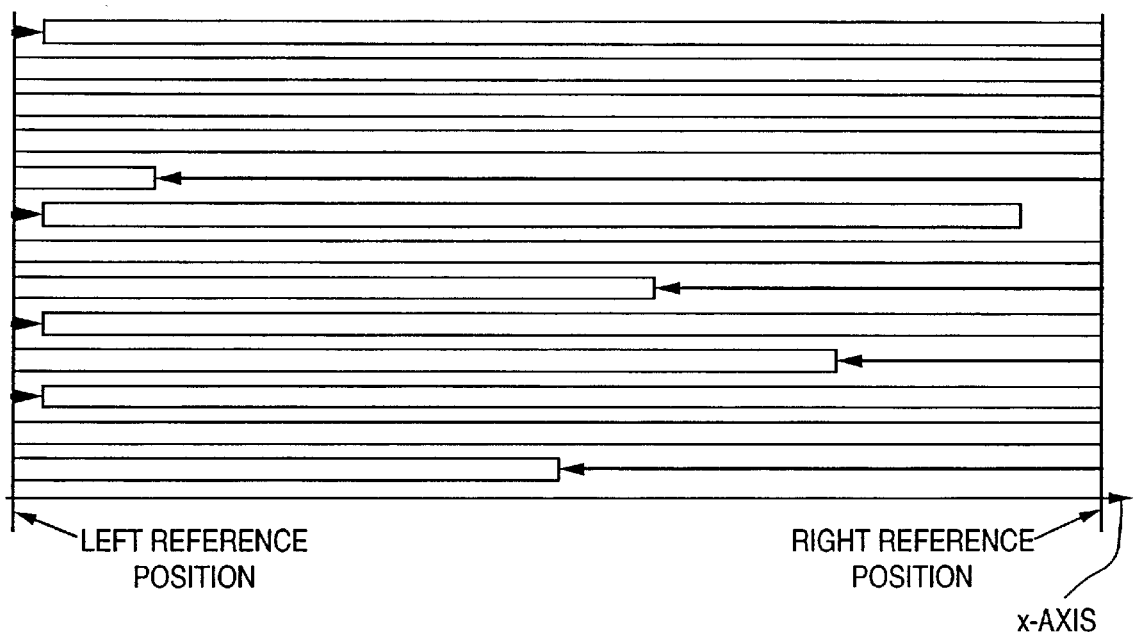

LEFT REFERENCE POSITION     RIGHT REFERENCE POSITION x-AXIS

SUN TOTAL OF OFFSETS ON LEFT SIDE Σ =

SUN TOTAL OF OFFSETS ON RIGHT SIDE Σ =

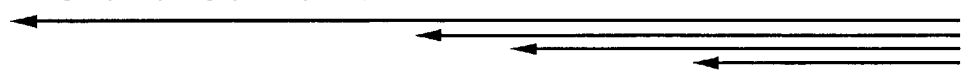

IMAGE FORMING APPARATUS AND METHOD

BACKGROUND OF THE INVENTION

In recent years, image forming apparatuses such as a copying machine, a printer, and the like popularly use a two-sided copying function, reduced-scale layout function, staple function, and the like. Conventionally, such image forming apparatus executes the two-sided copying function, reduced-scale layout function, and staple function, and the like in a predetermined direction.

However, in the prior art, troubles shown in, e.g., FIGS. 3A to 3F or FIGS. 4A to 4D have occurred. FIG. 3A shows an example wherein originals are copied on both surfaces of an output sheet so that the longitudinal direction of the sheet agrees with the up-and-down direction, and FIG. 3B shows an example wherein originals are copied on both surfaces of an output sheet so that the longitudinal direction of the sheet agrees with the right-and-left direction. In the case of left binding (horizontal binding), no problem is posed, but in the case of top binding (vertical binding), images on the front and back surfaces are turned upside down. This is because the sheet is inverted to have its long side as an axis. Note that vertical binding is the way of binding output sheets along their short sides, as shown in FIG. 4C, and the horizontal binding is the way of binding output sheets along their long sides, as shown in FIG. 4D.

FIGS. 3C to 3F show examples of a reduced-scale layout called a 4-in-1 layout. In this reduced-scale layout, one page is reduced to ½ in both vertical and horizontal directions, and one output page is made up of four pages of originals. The positions of the individual original pages are fixed, and the layout of the output page is determined in correspondence with the reading order of originals. In the layout, original pages are normally arranged in the order of upper left, upper right, lower left, and lower right positions when the output page is viewed in the vertically elongated position. FIG. 3C shows an example wherein originals whose longitudinal direction agrees with up-and-down direction are copied in a 4-in-1 layout. In this case, if originals are horizontally written ones, no problem is posed. However, if originals are vertically written ones such as Japanese newspapers, the individual originals are copied at unnatural positions. FIG. 3D shows an example wherein the same originals as in FIG. 3C are placed on the platen of the copying machine upside down, and the obtained copy is definitely unnatural. FIG. 3E shows an example wherein originals whose longitudinal direction agrees with the right-and-left direction are copied in a 4-in-1 layout. If originals are vertically written ones, the obtained copy is normal, but if they are horizontally written ones, the obtained copy becomes unnatural. FIG. 3F shows an example wherein originals are read in a direction opposite to that in FIG. 3E, and the obtained copy has definitely unnatural positions.

FIGS. 4A and 4B show two-sided copies in the reduced-scale layout. FIG. 4A shows a case wherein the longitudinal direction of the output sheet agrees with the up-and-down direction. In this case, if originals are horizontally written and copies are horizontally bound, no problem is posed. However, if copies are bound at their top side, the image on the back page is upside down upon turning over the page. FIG. 4B shows a case wherein the longitudinal direction of the output sheet agrees with the right-and-left direction. If copies are bound at their top side, the image on the back page is upside down, and is clearly unnatural.

As described above, since the two-sided copying and reduced-scale layout of originals are done in a predetermined direction of the output sheet, troubles occur when the user binds copies in a desired direction or the copies are stabled at a predetermined position.

SUMMARY OF THE INVENTION

The present invention has been made in consideration of the above-mentioned problems, and has as its first object to provide an image forming apparatus and method, which can form output images by re-laying out read original images in accordance with the designated layout.

It is another object of the present invention to provide an image forming apparatus which can reduce layout errors.

In order to achieve the first object, an image forming apparatus according to the present invention comprises the following arrangement.

That is, there is provided an image forming apparatus for forming a read original image on an output medium as an output image in a designated layout, comprising:

layout designation means for designating a layout;

image reading means for reading an original image as an image signal;

variable magnification-storage means for magnification-varying the image signal at a desired magnification and storing the magnification-varied image signal; and image forming means for forming an image in the layout designated by the layout designation means on the basis of the image signal stored by the variable magnification-storage means.

In order to achieve the first object, an image forming method according to the present invention comprises the following arrangement.

That is, there is provided an image forming method for forming a read original image on an output medium as an output image in a designated layout, comprising:

the variable magnification-storage step of magnification-varying an image signal read from an original image at a desired magnification and storing the magnification-varied image signal; and the image forming step of forming an image in a designated layout on the basis of the image signal stored in the variable magnification-storage step.

It is the second object of the present invention to provide an image forming apparatus and method, which can form a plurality of original images obtained by reading a plurality of originals on a recording medium in a practical layout.

In order to achieve the second object, an image forming apparatus according to the present invention comprises the following arrangement.

That is, there is provided an image forming apparatus for reading a plurality of pages of originals, and forming a plurality of original images corresponding to the read pages on a recording medium, comprising:

designation means for designating directions of the plurality of original images; and control means for controlling forming positions and directions of the plurality of original images on the recording medium on the basis of designation results of the designation means.

In order to achieve the second object, an image forming method according to the present invention comprises the following arrangement.

That is, there is provided an image forming method for reading a plurality of pages of originals, and forming a plurality of original images corresponding to the read pages on a recording medium, comprising:

the designation step of designating directions of the plurality of original images; and the control step of controlling forming positions and directions of the plurality of original images on the recording medium on the basis of designation results in the designation step.

It is the third object of the present invention to provide an image forming apparatus and method that can realize a natural reduced-scale layout, and a two-sided copying and stapling function independently of the directions of originals placed on a platen.

In order to achieve the third object, an image forming apparatus according to the present invention comprises the following arrangement.

That is, there is provided an image forming apparatus for visually outputting an image signal obtained by scanning an original, comprising:

means for extracting a text region in the original from the image signal;

means for detecting a reading direction of a character line in the original from the extracted text region; and means for performing predetermined image processing of the image signal in accordance with a designated image processing mode on the basis of the detected reading direction, whereby the image signal after the image processing is visually output.

In order to achieve the third object, an image forming method according to the present invention comprises the following arrangement.

That is, there is provided an image forming method for visually outputting an image signal obtained by scanning an original, comprising:

the step of extracting a text region in the original from the image signal;

the step of detecting a reading direction of a character line in the original from the extracted text region;

the step of performing predetermined image processing of the image signal in accordance with a designated image processing mode on the basis of the detected reading direction; and the step of visually outputting the image signal after the image processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A to 1D are views showing the copying states by a copying apparatus according to the first embodiment of the present invention;

FIG. 6 is a block diagram showing a controller in the copying apparatus in detail;

FIGS. 7A and 7B are plan views showing the outer appearance of a control panel;

FIG. 10 is a flow chart showing the page memory read sequence by a γ conversion circuit;

FIGS. 14A to 14D are explanatory views of original direction determination;

FIGS. 15A to 15D are views showing examples of document styles;

FIGS. 19A to 19F are views showing the layouts of originals by a copying apparatus according to the third embodiment of the present invention;

FIG. 24 is a view showing a document feeder and a layout display made on the feeder;

FIG. 33 is a timing chart of image signals output from the image processing circuit unit of the fifth embodiment;

FIG. 34 is a block diagram showing the arrangement of an original direction detector of the fifth embodiment;

FIG. 39 is a view showing two-sided copying and stapling processes corresponding to the reading directions;

FIG. 41 is a view showing the principle of obtaining alignment of the two ends from the character line layout of a text region;

DESCRIPTION OF THE PREFERRED EMBODIMENTS

First Embodiment

FIGS. 1A to 1D and FIGS. 2A and 2B plainly depict the copying states by a copying apparatus of the first embodiment. The images on the left-hand side of each arrow represent originals, the numbers on the originals indicate the reading order of originals, and the direction of each number indicates the up-and-down direction. Also, the images on the right-hand side of each arrow represent the copy results.

The images shown in FIGS. 1A to 1D and FIGS. 2A and 2B are icons displayed on a control panel (FIGS. 7A and 7B; to be described later) on the copying apparatus of this embodiment, and the user selects the layout upon copying from those displayed icons. When the user selects a desired layout, images are processed and copied in accordance with the instruction. A detailed explanation of this process will be given below.

Figure 5:
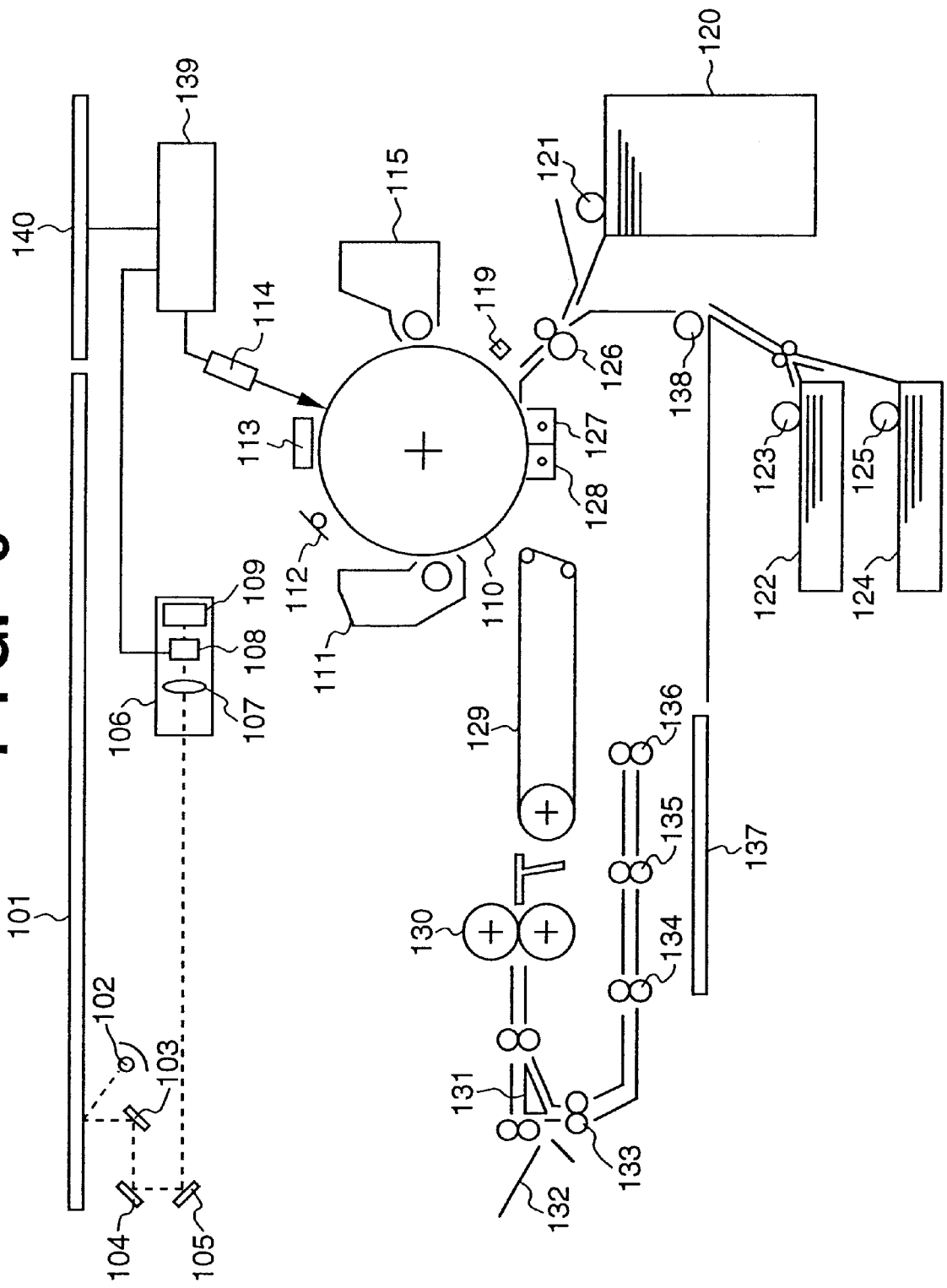
FIG. 5 is a sectional view for explaining the arrangement of a copying apparatus.

The basic operation of the copying apparatus of the first embodiment will be explained. FIG. 5 is a sectional view for explaining the arrangement of the copying apparatus.

Referring to FIG. 5, reference numeral 101 denotes a platen glass on which an original is placed at a predetermined position. Reference numeral 102 denotes an original illumination lamp comprising, e.g., a halogen lamp, which exposes an original placed on the platen glass 101. Reference numerals 103, 104, and 105 denote scanning mirrors, which are housed in an optical scanning unit (not shown), and guide light reflected by the original toward a CCD unit 106 while moving reciprocally. The CCD unit 106 comprises an imaging lens for imaging the light reflected by the original on a CCD, an image sensing element (CCD) 108 comprising, e.g., a CCD, a CCD driver 109 for driving the image sensing element 108, and the like. An image signal output from the image sensing element 108 is converted into, e.g., 8-bit digital data, that is input to a controller 139.

Note that the copying apparatus has a detachable automatic document feeder for automatically feeding a plurality of originals one by one and sequentially setting the front and back surfaces of each original on the platen glass 101.

Reference numeral 110 denotes a photosensitive drum, which is charge-removed by a pre-exposure lamp 112 to prepare for image formation. Reference numeral 113 denotes a charger for uniformly charging the photosensitive drum 110. Reference numeral 114 denotes an exposure unit (laser unit) which comprises, e.g., a semiconductor laser, and forms an electrostatic latent image on the photosensitive drum 110 by exposure on the basis of an image signal processed by the controller 139 that controls the image processing and the overall apparatus. Reference numeral 115 denotes an exchangeable developer, which can be easily set by the user at a predetermined position in the apparatus. The developer 115 stores, e.g., black developing agent (toner). Reference numeral 119 denotes a pre-transfer charger for applying a high voltage before a toner image developed on the photosensitive drum 110 is transferred onto a paper sheet. Reference numerals 120, 122, and 124 denote paper feed units, from each of which a transfer paper sheet is fed into the apparatus by driving a corresponding one of paper feed rollers 121, 123, and 125. The fed paper sheet temporarily stops at the position of registration rollers 126, and is then fed again in synchronism with the write-start timing of the image formed on the photosensitive drum 110. Reference numeral 127 denotes a transfer charger for transferring a toner image developed on the photosensitive drum 110 onto the fed transfer paper sheet. Reference numeral 128 denotes a peeling charger for peeling the transfer paper sheet, on which the image has been transferred, from the photosensitive drum 110. The residual toner on the photosensitive drum is recovered by a cleaner 111.

Reference numeral 129 denotes a conveyor belt for conveying the transfer paper sheet that has been subjected to the transfer process to a fixing device 130 to fix the transferred image by, e.g., heat. Reference numeral 131 denotes a flapper for controlling the convey path of the transfer paper sheet that has been subjected to the fixing process to one of the positions of an exhaust tray 132 or an intermediate tray 137. Reference numerals 133 to 136 denote feed rollers for feeding the transfer paper sheet that has been subjected to the fixing process once to the intermediate tray 137 in a reversed (multiple copying) or non-reversed (two-sided copying) state. Reference numeral 138 denotes a re-feed roller which conveys the transfer paper sheet placed on the intermediate tray 137 to the position of the registration rollers 126 again. Upon two-sided copying, a paper sheet is fed onto the intermediate tray 137. In this case, the paper sheet is conveyed in a direction along its short side, is consequently reversed about a direction along its long side as an axis, and is then subjected to two-sided copying.

The controller 139 comprises a microcomputer, image processor, and the like (to be described later), and performs the above-mentioned image forming operation in accordance with an instruction from a control panel 140.

FIG. 6 is a block diagram showing the arrangement of the controller in the copying apparatus of the first embodiment in detail.

Reference numeral 201 denotes a CPU for controlling the entire copying apparatus. The CPU 201 sequentially reads and executes programs from a read-only memory (ROM) 203 that stores the control sequences (control programs) of the apparatus main body. The address bus and data bus of the CPU 201 are connected to the individual constituting elements via a bus driver/address decoder circuit 202. Reference numeral 204 denotes a random access memory (RAM) serving as a main memory device used as a storage area of input data, work area, and the like. Reference numeral 205 denotes an I/O interface, which is connected to the respective constituting elements of the apparatus such as the control panel 140 at which the operator makes key inputs and which displays the status and the like of the apparatus using a liquid crystal display and LEDs, motors 207, clutches 208, and solenoids 209 which drive the paper feed system, convey system, and optical system, a paper sensor 210 for detecting the conveyed paper sheet, and the like. Furthermore, a remaining toner sensor 211 for detecting the toner amount in the developer 115 is arranged in the developer 115, and its output signal is input to the I/O interface 205. Reference numeral 215 denotes a high-voltage control unit, which outputs high voltages to the above-mentioned charger 113, developer 115, pre-transfer charger 119, transfer charger 127, and peeling charger 128.

Reference numeral 206 denotes an image processor which receives an image signal output from the CCD unit 106, and performs image processing (to be described later). The image processor 206 outputs a control signal of the laser unit 114 in accordance with an image signal obtained by the image processing. A laser beam output from the laser unit 114 is irradiated onto the photosensitive drum 110.

Figure 8:
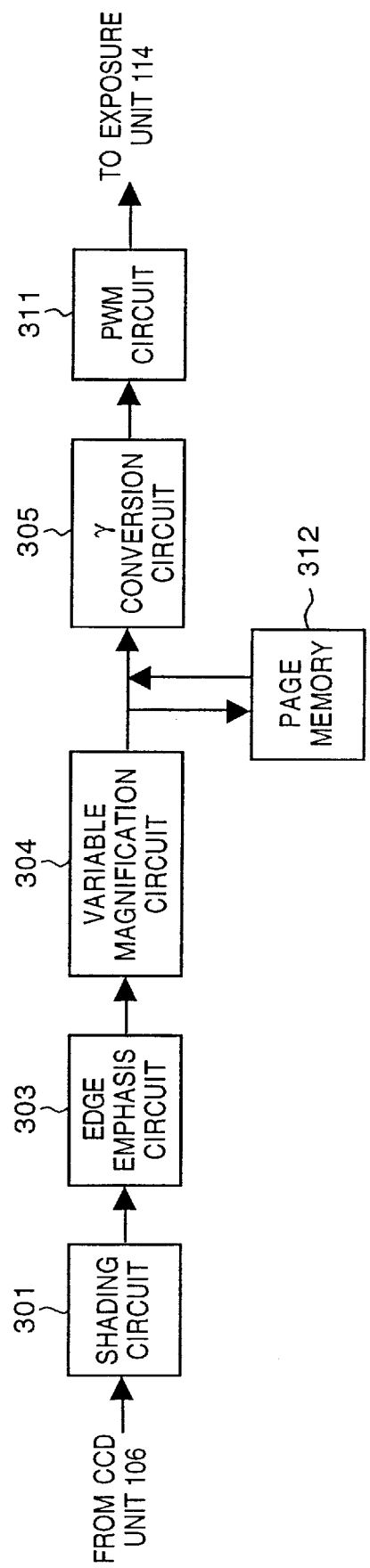
FIG. 8 is a block diagram showing an image processor in the controller in detail.

FIG. 8 is a block diagram showing the arrangement of the image processor in the controller of the copying apparatus of the first embodiment in detail.

An image signal which is converted into an electrical signal by the CCD 108 is input to a shading circuit 301 to correct variations among pixels. Thereafter, an edge emphasis circuit 303 calculates the second derivative of the image signal using, e.g., a 5×5 window, thereby emphasizing the edge of an image. Furthermore, a variable magnification circuit 304 decimates data in a reduction copying mode, or interpolates data in an enlargement copying mode. In a two-sided copying or reduced-scale layout mode, the image signal is stored in a page memory 312, and is read out from the page memory 312 while switching the read addresses so as to obtain a copy corresponding to an instruction from the control panel 140. Since this image signal is luminance data, a γ conversion circuit 305 performs data conversion by table search so as to convert the luminance data into density data to be output to a printer. The image signal which is converted into the density data is input to a PWM circuit 311 to be converted into an emission intensity signal of a laser, and a pulse width corresponding to the density of an image is output to the exposure unit 114.

FIGS. 7A and 7B show the outer appearance of the control panel in FIG. 6 of the first embodiment. When an extended function button is selected in the state shown in FIG. 7A, and thereafter, the reduced-scale layout mode, the two-sided copying mode, or the like is selected, icons shown in FIGS. 1A to 1F are displayed. This state corresponds to FIG. 7B. The user selects a desired layout from the icons displayed on the control panel 140. When the layout is selected, the CPU 201 in FIG. 6 supplies a processing instruction to the image processor 206. For example, in the 4-in-1, reduced-scale layout mode, image signals for four pages of originals, which are reduced by the variable magnification circuit 304 in FIG. 8, are stored in the page memory 312. After storage, the image signals are read out from the page memory 312 to obtain a layout designated by the user. Then, images are formed on the photosensitive drum 110 via the γ conversion circuit 305, PWM circuit 311, and exposure unit 114.

Figure 9:
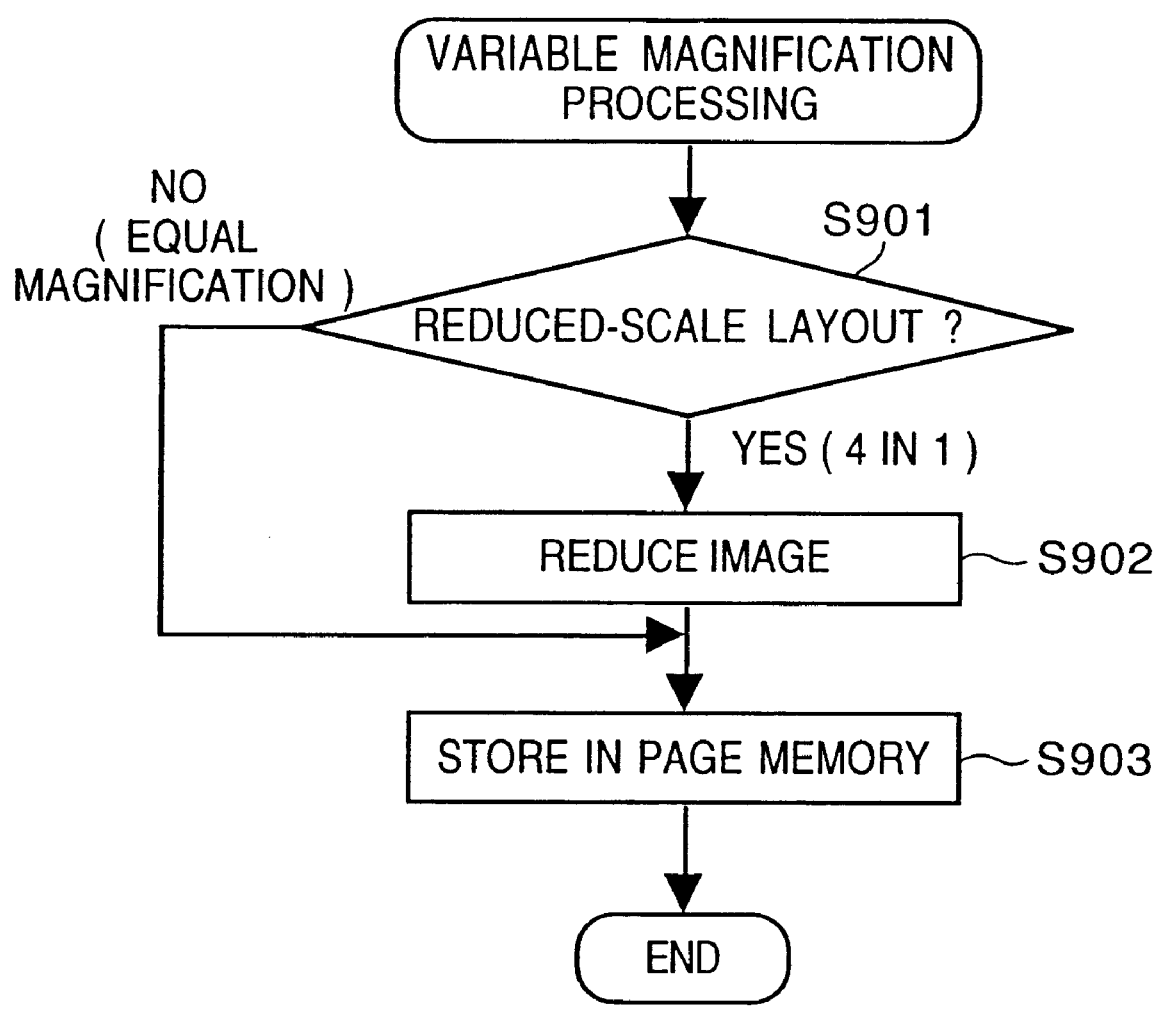
FIG. 9 is a flow chart showing the sequence of variable magnification processing by a variable magnification circuit.

FIG. 9 is a flow chart showing the sequence of the variable magnification processing by the variable magnification circuit of the first embodiment, and FIG. 10 is a flow chart showing the page memory read sequence by the γ conversion circuit of the first embodiment.

Figure 11A:
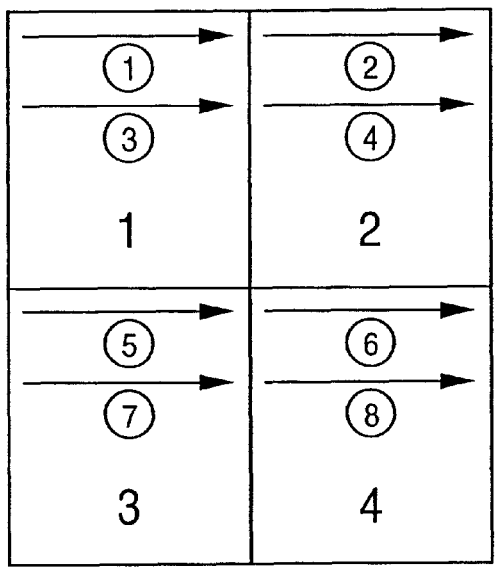
FIGS. 11A and 11B are views showing the read states of images from a page memory.
Figure 11B:
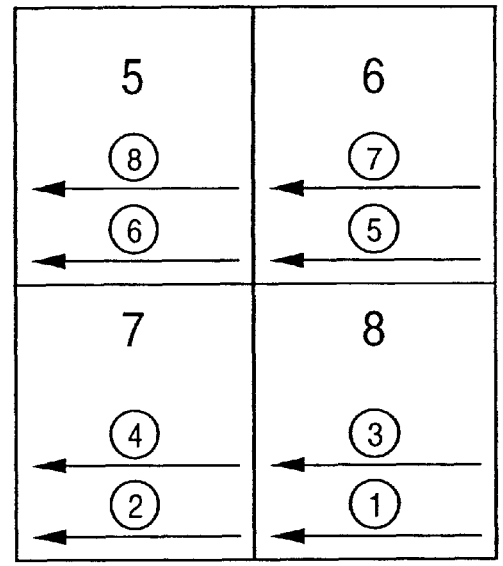

In FIG. 9, it is checked if a reduced-scale layout (4-in-1) is designated (step S901). If the reduced-scale layout is designated (YES in step S901), the length and width of each image signal are reduced to ½ (step S902). The reduced image signal is stored in the page memory 312 (step S903). In this case, the reduced image signals for four pages of originals are stored in the page memory 312 in a predetermined order. In the first embodiment, as shown in FIGS. 11A and 11B, the reduced image signals for four pages of originals are stored in the page memory 312, so that the first page of originals is formed at the upper left position of an output sheet, and the subsequent pages are formed in the order of upper right→lower left→lower right to form one page.

On the other hand, if an equal-magnification mode is designated (NO in step S901), an image signal is directly stored in the page memory 312 from a predetermined address.

The γ conversion circuit 305 reads out the image signals, which are stored in the page memory 312, as described above, in accordance with the sequence shown in FIG. 10 to be described below, in correspondence with the designated layout.

It is checked if the image signals stored in the page memory 312 correspond to the even page of a two-sided copy (step S1001). If the image signals do not correspond to the even page of a two-sided copy (NO in step S1001), i.e., if the two-sided copying mode is not selected or the image signals correspond to an odd page even in the two-sided copying mode, it is checked if a 4-in-1 layout is designated (step S1002). If the 4-in-1 layout is not designated (NO in step S1002), i.e., if the equal-magnification copying mode is selected, image signals are read out from the page memory 312 in the same order as their write order. On the other hand, if the 4-in-1 layout is designated (YES in step S1002), image signals are read out from the page memory 312 in accordance with the designated layout. FIG. 11A shows an example of the read order. The 4-in-1 designated image signals are stored in the page memory 312, as shown in FIG. 11A. For example, if a layout for horizontal writing shown in FIG. 1C is designated, the first and second pages of image signals stored in the page memory 312 are read out in the order of arrows ①, ②, ③, ④, . . . in FIG. 11A, and the third and fourth pages are read out in the order of arrows ⑤, ⑥, ⑦, ⑧, . . . On the other hand, if a layout for vertical writing shown in FIG. 1C is designated, since the order of pages is 3→1→4→2 from the upper left position, the read order is determined in correspondence with this order, i.e., the third and first pages are read out in the order of arrows ⑤, ①, ⑦, ③, . . . , and the fourth and second pages are read out in the order of arrows ⑥, ②, ⑧, ④, . . . The same applies to other layouts, and image signals are read out from the page memory 312 in correspondence with the designated layout.

On the other hand, if the image signals correspond to the even page of a two-sided copy (YES in step S1001), i.e., when the image signals to be recorded on the back side of the two-sided copy are stored in the page memory 312, it is also checked if the 4-in-1 layout is designated (step S1005). If the 4-in-1 layout is not designated (NO in step S1005), i.e., if the equal-magnification copying mode is selected, it is checked if the designated layout is one for horizontal or vertical binding (step S1006). This checking is done based on the operator's designation. As can be seen from FIGS. 1A and 1B, if a layout for horizontal binding is selected, the binding direction, i.e., the long side direction, serves as the reversing axis of a paper sheet in the copying apparatus. For this reason, the image signal of interest need only be printed in the same manner as the odd page of a two-sided copy, i.e., the front side, so that images on the two surfaces can be normally observed upon turning over the page. In this case, the flow branches to step S1003. On the other hand, if a layout for vertical binding is selected, since one short side of a paper sheet is bound, the image signal stored in the page memory 312 must be rotated through 180° before printing. In this case, the image signal is read out from the page memory 312 in an order opposite to the normal order (step S1007). That is, an image signal is normally read out from its head address, but in this case, an image signal is read out from its end address. When the readout image signal is normally recorded as an image from its head address, the image is consequently rotated through 180° from the state stored in the page memory 312.

If it is determined in step S1005 that the 4-in-1 layout is designated (YES in step S1005), it is checked if the designated layout is one for horizontal or vertical binding (step S1008). If the layout for horizontal binding is designated, the flow branches to step S1004 for the same reason as in step S1006, and the image signals are read out in the same order as that of the odd page of a two-sided copy, i.e., the front side. On the other hand, if the layout for vertical binding is selected, reduced image signals for four pages are read out from the page memory 312 in the order opposite to the normal order in correspondence with the designated layout. For example, if the upper layout for vertical binding in FIG. 1E is designated, pages 5 to 8 to be formed on the back surface of the output sheet are stored in the page memory 312, as shown in FIG. 11B. For this reason, since these image signals need only be rotated through 180° while keeping their positions, the eighth and seventh pages are read out from their end addresses, as indicated by arrows ①, ②, ③, ④, ..., and subsequently, the fifth and sixth pages are read out from their end addresses, as indicated by arrows ⑤, ⑥, ⑦, ⑧, ... On the other hand, if the lower layout for vertical binding in FIG. 1E is designated, the positions of pages to be formed on the rear side are 7→5→8→6 from the upper left position. In order to rotate these image signals through 18°, in FIG. 11B, the seventh and fifth pages are read out in the order of arrows ②, ⑥, ④, ⑧, ..., and subsequently, the eighth and sixth pages are read out in the order of arrows ①, ⑤, ③, ⑦, ... If other layouts are designated, reduced pages are read out from their end addresses in the reverse order in correspondence with the designated layout, thus obtaining rotated image signals for vertical binding.

As described above, in the case of a two-sided copy, when the direction of the axis upon reversing a sheet to form a two-sided copy in the copying apparatus agrees with the direction of the side where the output sheet is bound, the image signals to be copied onto the back surface of the output sheet can be read out from the page memory 312 in the same manner as in the front surface and the readout signals can be recorded. However, when these directions do not agree with each other, the image signals to be recorded on the back surface must be read out so that the readout images are rotated through 180° from those recorded on the front surface.

As described above, image signals are read out from the page memory 312 in accordance with the sequence shown in FIG. 10 and are input to the γ conversion circuit 305, thus finally printing out these signals. In this manner, the operator can designate the direction of a two-sided copy, the document positions of a reduced-scale layout, and the binding position from the control panel 140, and images can be output in correspondence with the designated layout. As a result, errors that images cannot be output in a desired layout can be prevented, and the apparatus of this embodiment contributes to efficient copying and resource savings.

Second Embodiment

Figure 2A:
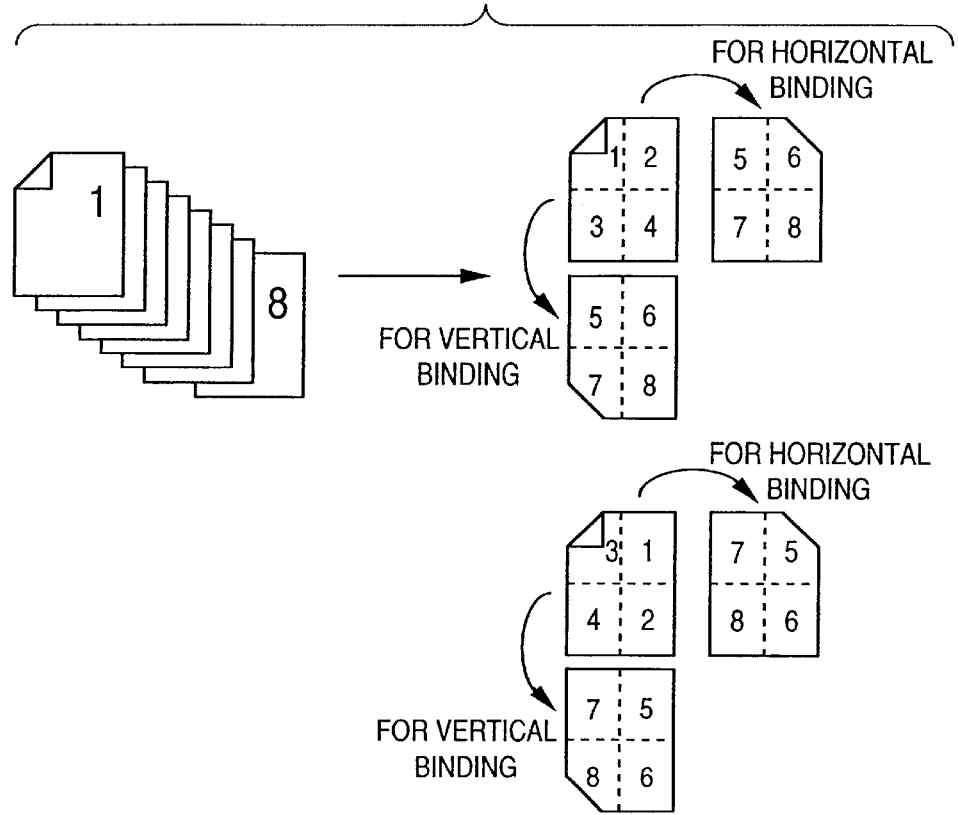
FIGS. 2A and 2B are views showing the copying states by the copying apparatus of the first embodiment.
Figure 2B:
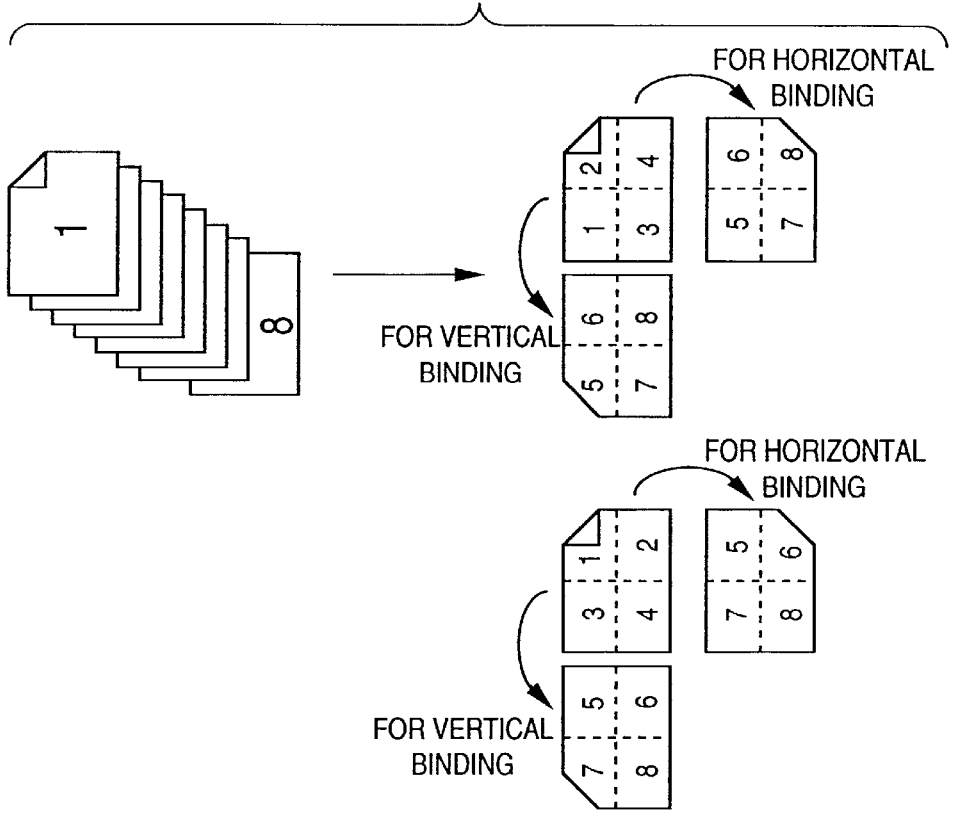
Figure 3A:
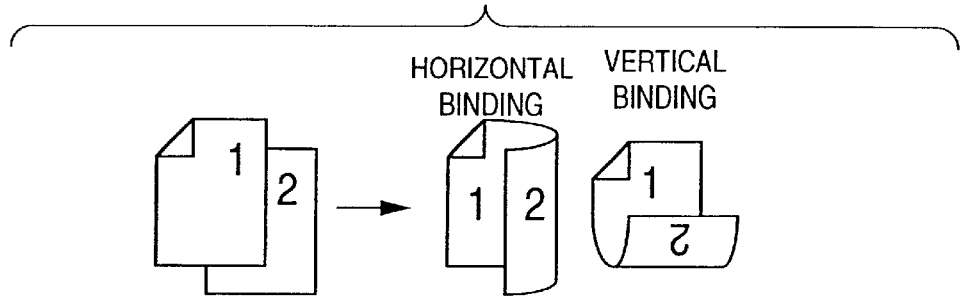
FIGS. 3A to 3F are views showing examples of the copy results by a conventional copying apparatus.
Figure 3B:
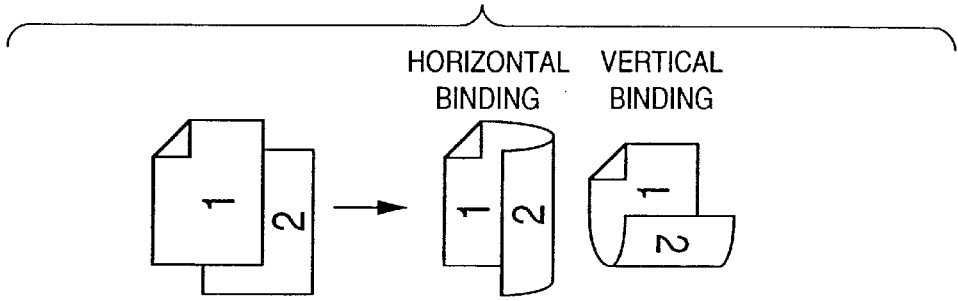
Figure 3C:
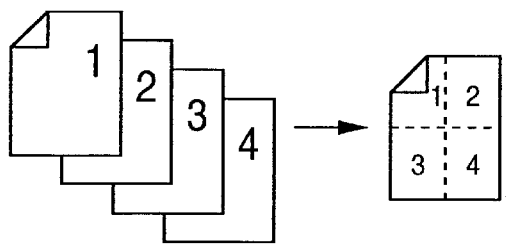
Figure 3D:
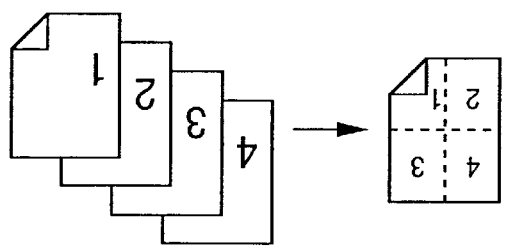
Figure 3E:
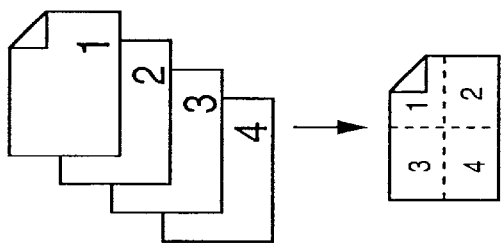
Figure 3F:
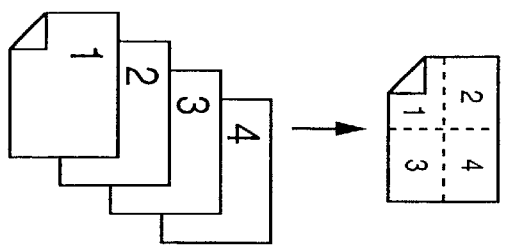
Figure 4A:
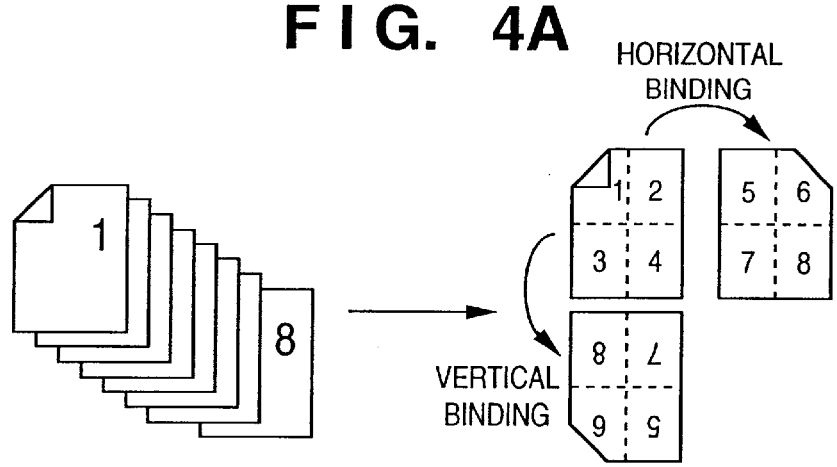
FIGS. 4A to 4D are views showing examples of the copy results by the conventional copying apparatus.
Figure 4B:
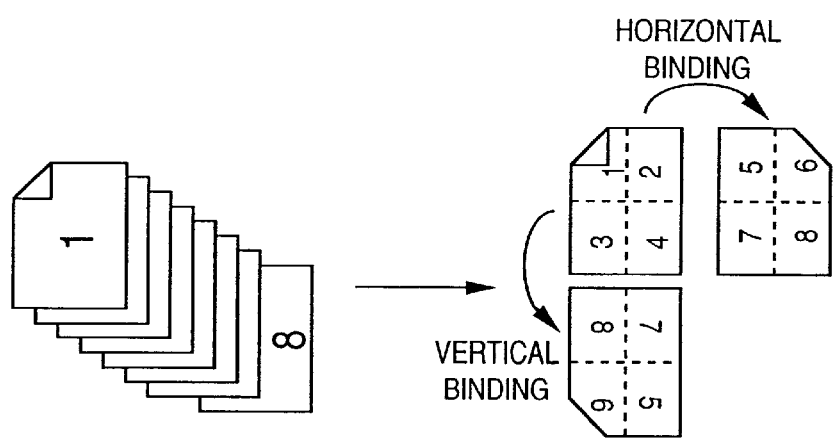
Figure 4C:
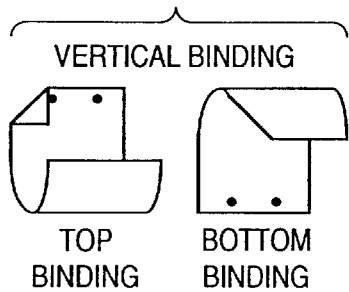
Figure 4D:
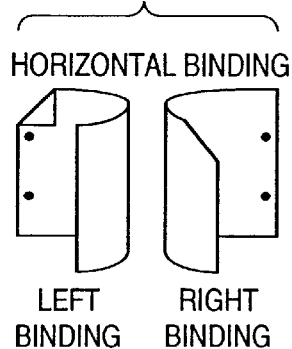
Figure 13A:
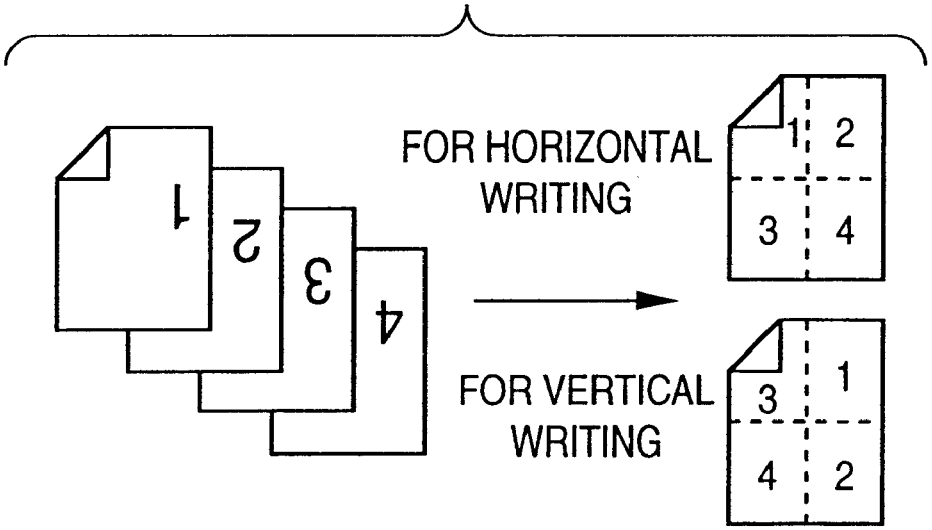
FIGS. 13A and 13B are views showing the state wherein the direction of originals is recognized upon copying original images.
Figure 13B:
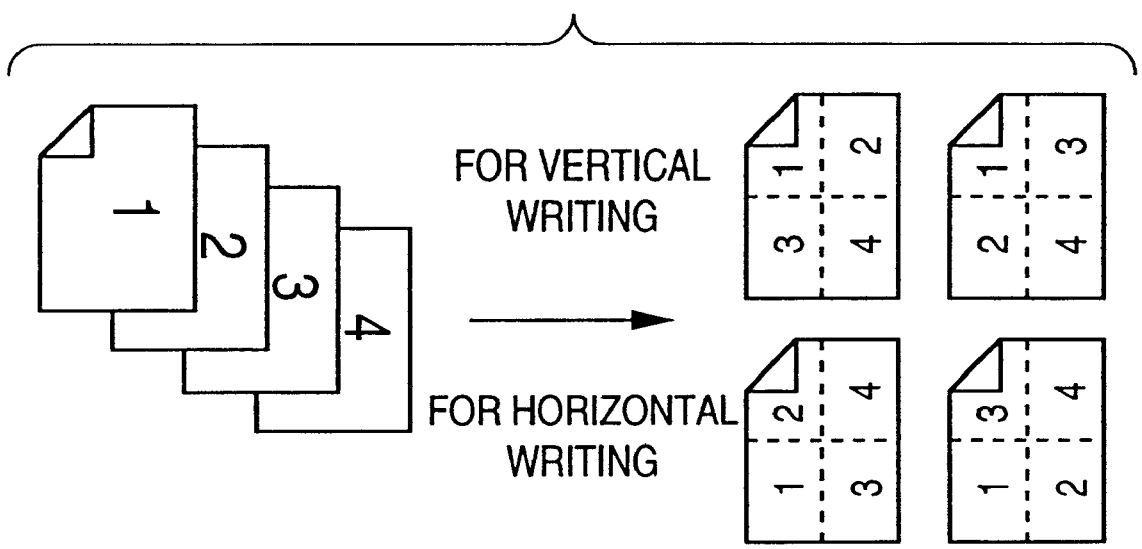

In some cases, the user may place originals on the copying apparatus or the like in a wrong way. At this time, if the 4-in-1 layout is designated, the original images are copied in an unnatural layout, as shown in FIGS. 3D and 3F, and the like. As shown in FIGS. 18A to 18D, a single original can be placed in four different ways. In the first embodiment, when originals are placed with their top side pointing up or to the left, as shown in FIGS. 1A to 1D, their copies are output in correspondence with the designated layout. Even when originals are set in other directions, if the set direction of the originals is automatically recognized, a natural layout can be obtained, as shown in FIGS. 13A and 13B. Since the apparatus itself automatically recognizes the direction of originals, images shown in FIGS. 13A and 13B need not be displayed on the control panel 140.

Figure 12:
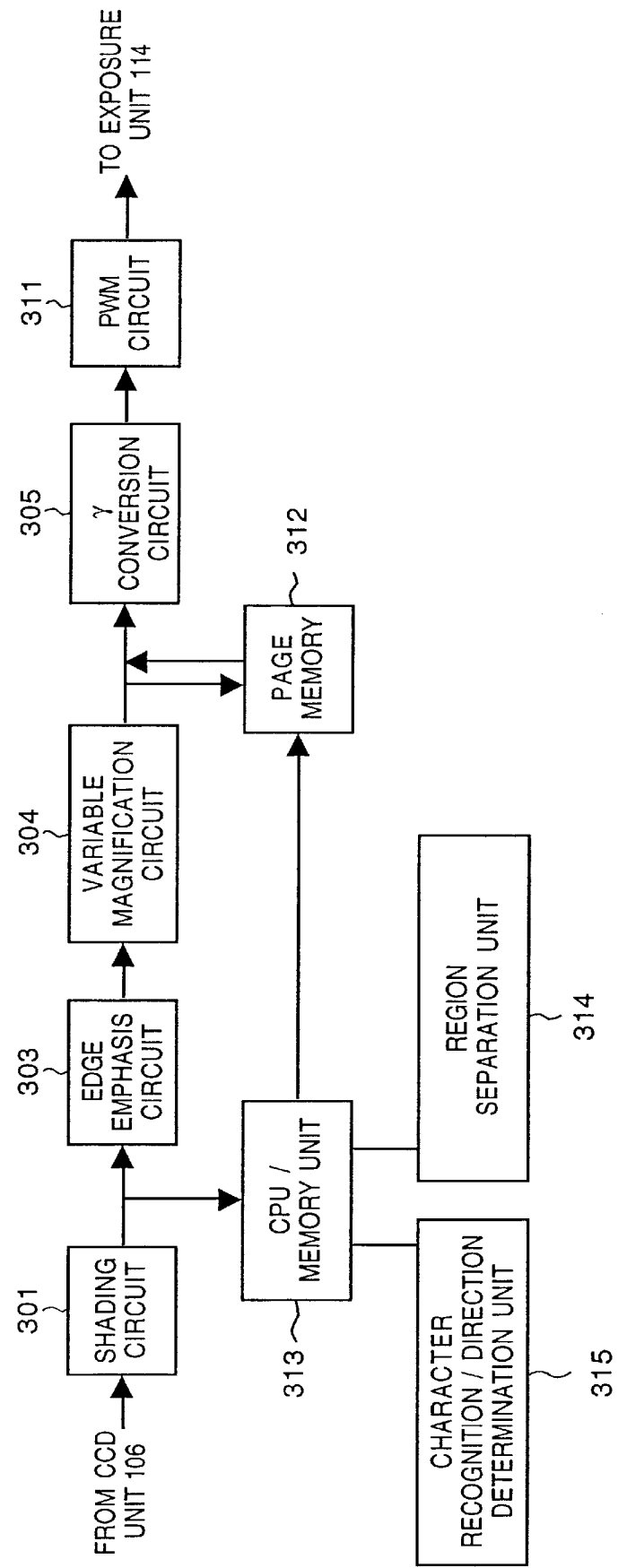
FIG. 12 is a block diagram showing an image processor according to the second embodiment of the present invention in detail.
Figure 16:
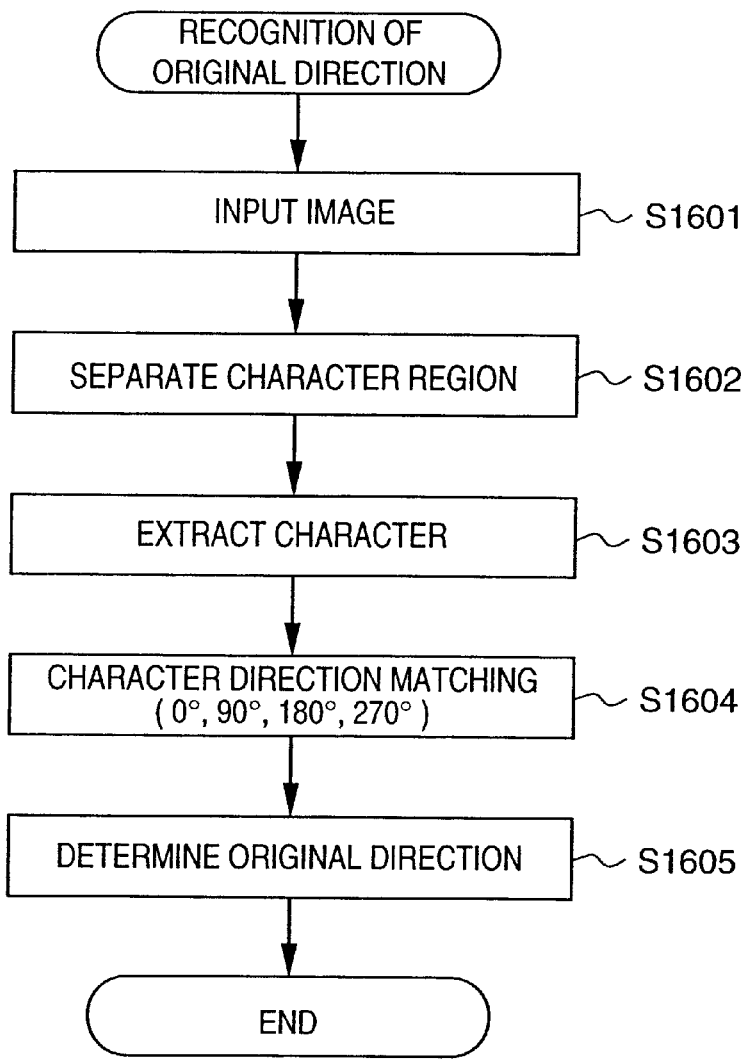
FIG. 16 is a flow chart showing the sequence for recognizing the original direction.

The arrangement of the copying apparatus of the second embodiment is substantially the same as that of the first embodiment shown in FIGS. 5 and 6, except that an arrangement for recognizing and rotating the direction of originals is added to the image processor 206, as shown in FIG. 12. At this time, a CPU/memory unit 313 in the circuit shown in FIG. 12 recognizes the direction of originals in the sequence shown in FIG. 16. When original images are read, image signals after shading are decimated and stored (step S1601). A region separation unit 314 separates a character region (step S1602), and extracts a character (step S1603). Based on the extracted character, a character recognition/direction determination unit 315 compares the character direction of the original with character samples in 0°, 90°, 180°, and 270° directions (step S1604), and determines the direction of the original (step S1605).

Figure 14B:
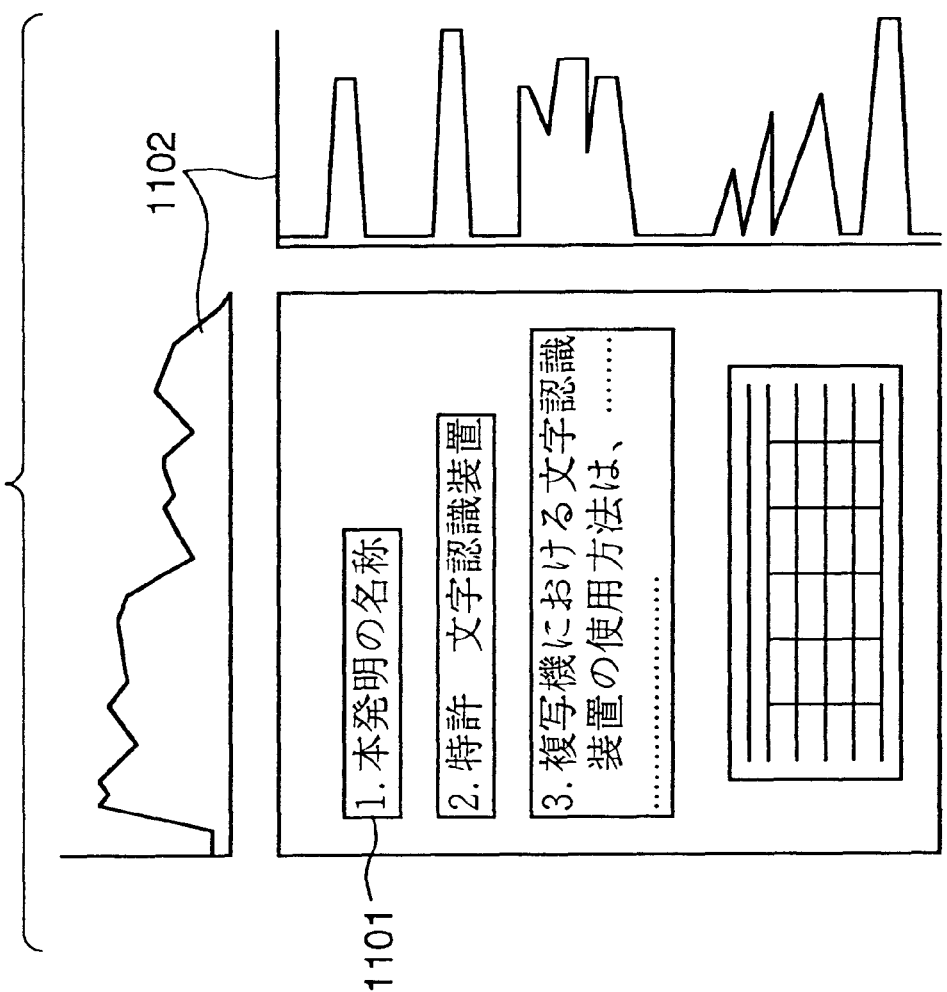
Figure 14A:
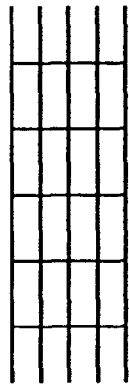

FIGS. 14A to 14D are explanatory views of that direction determination. FIG. 14A depicts an original, and the region separation unit 314 extracts and separates character regions enclosed in rectangles from an image (FIG. 14B) obtained by reading the original shown in FIG. 14A by calculating histograms in the vertical and horizontal directions. Characters are extracted from, e.g., a separated character region 1101, as shown in FIG. 14C. The character recognition/direction determination unit 315 determines the direction of each extracted character. For this purpose, the unit 315 executes character recognition while rotating the extracted character in 90° increments, determines a character with the highest degree of matching as a recognized character, and recognizes the direction of the character at that time as the direction of the original. FIG. 14D takes a character "本" as an example. When that character is rotated through 0°, the recognized character is "本"; when the character is rotated through 90°, the recognized character is "町"; when the character is rotated through 180°, the recognized character is "克"; and when the character is rotated through 270°, the recognized character is "式". The degrees of matching of these characters are 0.90, 0.40, 0.30, and 0.50, and in this case, since the character at 0° has the highest degree of matching, the direction of the original is determined to be 0°.

The CPU/memory unit 313 rotates the direction of image signals in units of pages stored in the page memory 312 in accordance with the recognized direction of the original. For example, as for a vertically elongated original, an image is rotated to have the same state as that read when the original is placed with its top side pointing up. The same applies to a horizontally elongated original, and an image is rotated to have the same state as that read when the original is placed with its top side pointing to the left.

Note that this rotation processing requires determination of whether the up-and-down direction of an original agrees with the longitudinal direction (vertically elongated) or the widthwise direction (horizontally elongated). This determination may be attained by a sensor set on the platen. Alternatively, in place of such determination, it may be postulated that originals are always placed at the vertically elongated position, and if the character recognition/direction determination unit 315 recognizes that the top portion of the original points down or to the left, the image signal of that page may be rotated through 180°. In this case, the arrangement can be simplified, and the effects obtained remain practically the same.

The rotated image signals are read out from the page memory 312 in correspondence with the layout selected by the operator in the same manner as in the first embodiment, and the readout signals are printed out.

If the original direction can be recognized at sufficiently high speed, image signals may be stored in the page memory 312 after they are rotated, in place of rotating image signals stored in the page memory 312 and re-storing them. Also, the γ conversion circuit 305 may read out image signals from the page memory 312 in an order as a combination of rotation corresponding to the original direction and the read order corresponding to the layout described in the first embodiment.

Furthermore, as shown in FIGS. 15A to 15D, there are four different document styles, i.e., a vertically elongated, horizontally written document in FIG. 15A, a horizontally elongated, horizontally written document shown in FIG. 15B, a horizontally elongated, vertically written document shown in FIG. 15C, and a vertically elongated, vertically written document shown in FIG. 15D. Hence, by adding determination of the writing direction of characters (horizontal writing, vertical writing) in addition to that of the original direction, the user may select the writing direction of characters of a reduced-scale layout after image signals are stored in the page memory 312. In this case, the number of choices on the control panel 140 from which the user has to choose can be reduced, and the operability can be improved. The writing direction of characters can be determined by calculating the histograms of a character region in the vertical and horizontal directions or determining the longitudinal direction of a character region. For example, if it is determined that the original is a vertically elongated, horizontally written one, the number of choices for a 4-in-1 single-sided copy can be reduced from 6 as combinations of FIGS. 1C and 1D when the writing direction is not determined to one shown in FIG. 1C. That is, the operator need not select the writing direction of character on the control panel 140.

Figure 17:
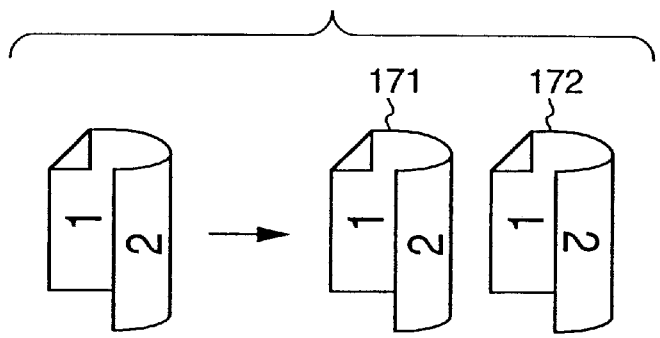
FIG. 17 is a view showing the copying state of a two-sided original.
Figure 18A:
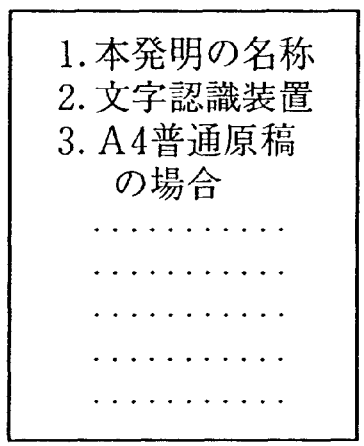
FIGS. 18A to 18D are views showing examples of the way of placing an original.
Figure 18B:
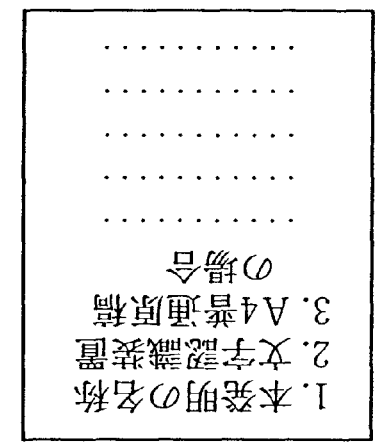
Figure 18C:
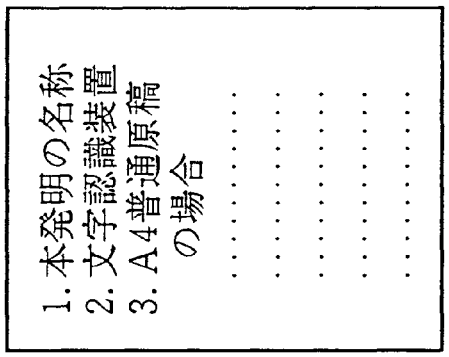
Figure 18D:
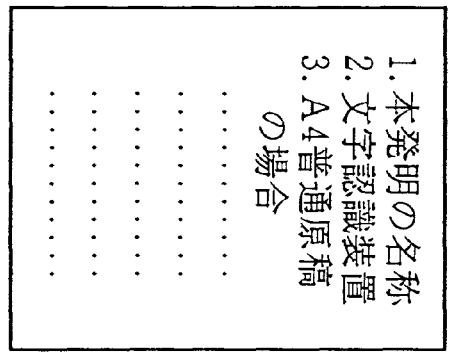
Figure 20A:
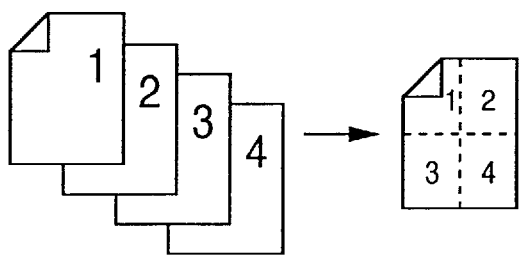
FIGS. 20A to 20D are views showing the layouts of originals by the copying apparatus of the third embodiment.
Figure 20B:
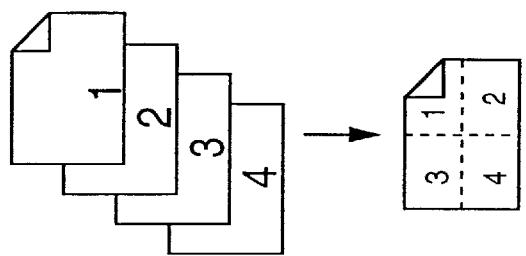
Figure 20C:
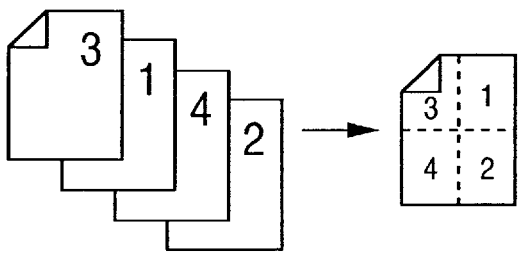
Figure 20D:
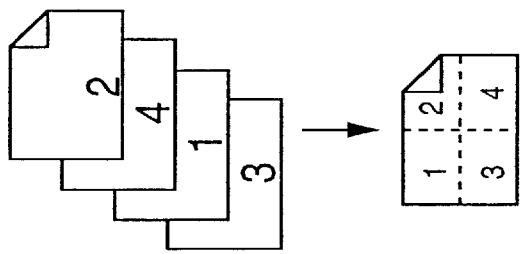
Figure 21A:
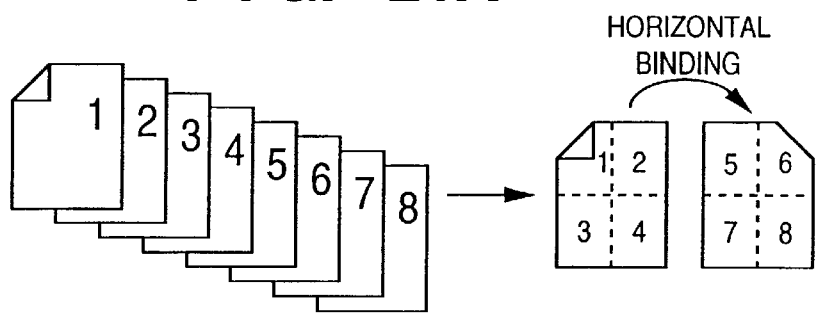
FIGS. 21A to 21D are views showing the layouts of originals by the copying apparatus of the third embodiment.
Figure 21B:
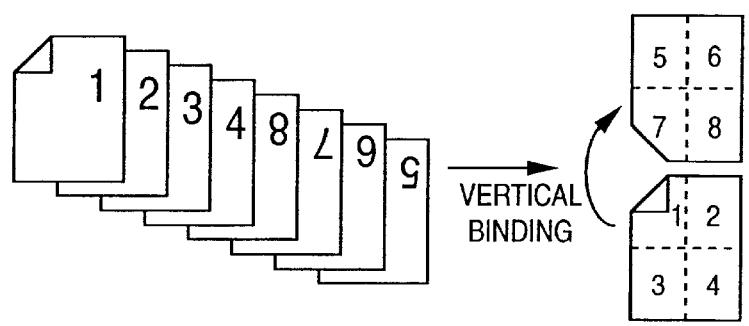
Figure 21C:
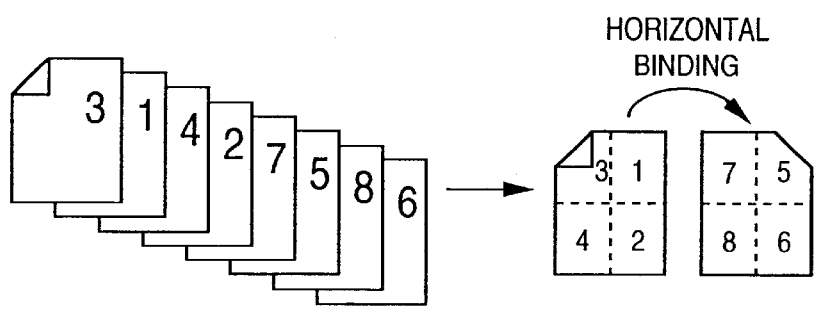
Figure 21D:
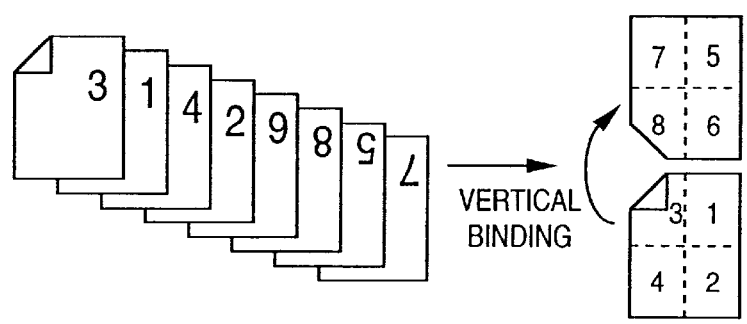
Figure 22A:
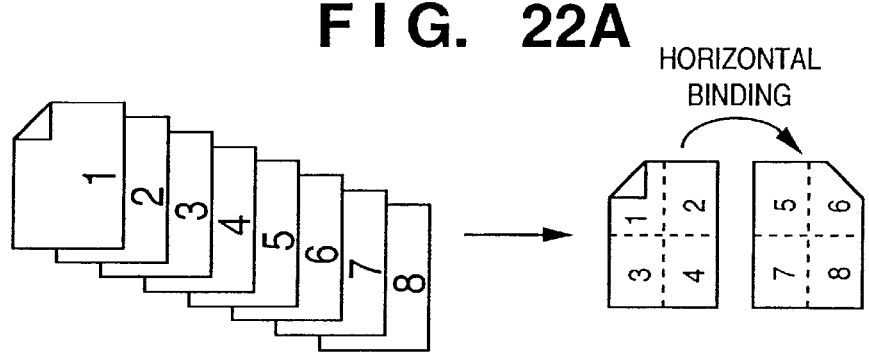
FIGS. 22A to 22D are views showing the layouts of originals by the copying apparatus of the third embodiment.
Figure 22B:
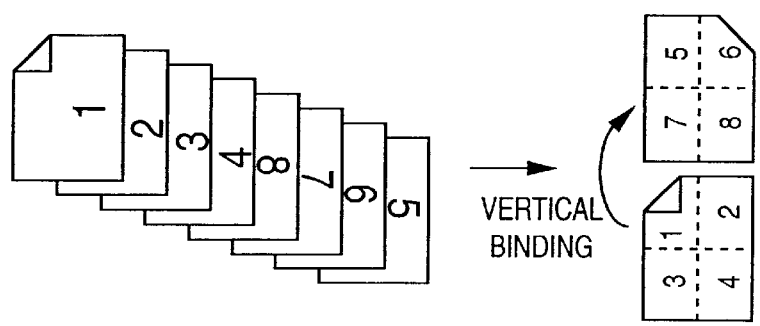
Figure 22C:
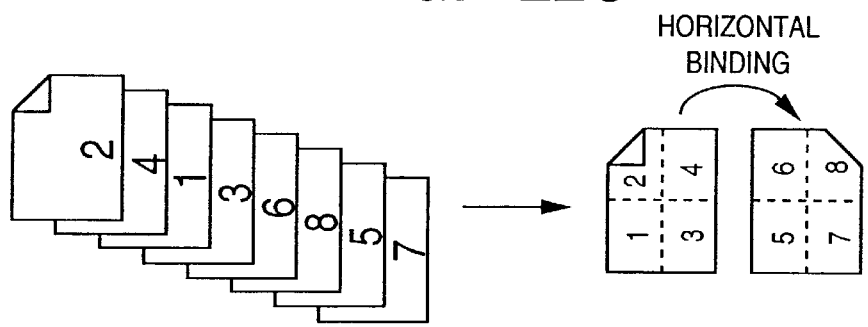
Figure 22D:
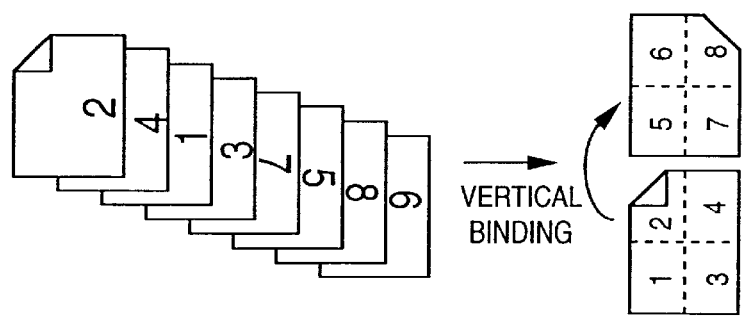

Furthermore, since the copying apparatus with a document feeder can read a two-sided original, the user may make a choice shown in FIG. 17. In this case, if the user selects a pattern 171 in FIG. 17, the image on the back side is copied as it is with respect to the image on the front side of a two-sided copy; if the user selects a pattern 172, the image to be copied on the back side is rotated through 180°. In this manner, the binding direction can be changed from vertical binding to horizontal binding or vice versa.

Third Embodiment

A copying apparatus of the third embodiment has the same arrangement as that described in the first embodiment. However, the copying apparatus of the third embodiment does not have a function of laying out output images in correspondence with the layout selected by the operator but has a function of presenting output results corresponding to the setting positions of originals to the operator.

FIGS. 19A to 22D show layouts of originals in the copying apparatus of the third embodiment, and these layouts are displayed on the control panel 140 when the operator selects a layout. In this case, the operator actually selects a reduction factor (equal magnification/2-in-1/4-in-1), and a single-sided/two-sided copy mode.

FIGS. 19A to 19D show layouts for an equal-magnification, two-sided copy. FIGS. 19E and 19F show layouts for a so-called 2-in-1, two-sided copy. In the 2-in-1 layout, the length and width of an original are respectively reduced to $1/\sqrt{2}$, and originals images for two pages are formed on a single output sheet. FIGS. 20A to 20D show layouts for a 4-in-1, single-sided copy. FIGS. 21A to 21D and FIGS. 22A to 22D show layouts for a 4-in-1, two-sided copy.

Figure 23A:
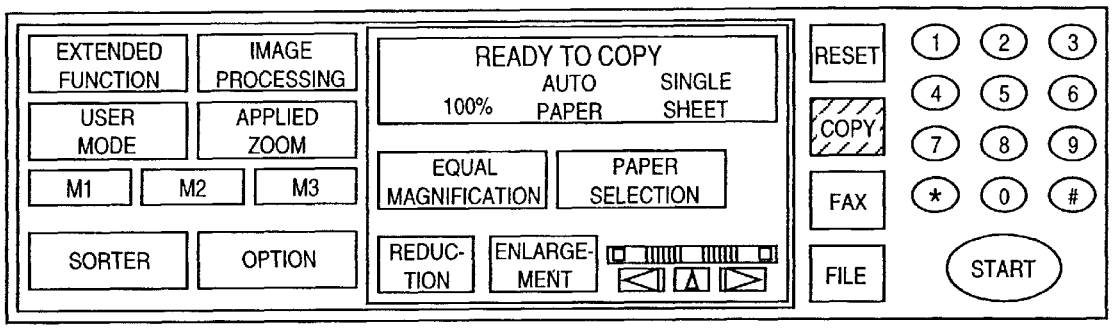
FIGS. 23A and 23B are views showing a control panel of the copying apparatus of the third embodiment.
Figure 23B:
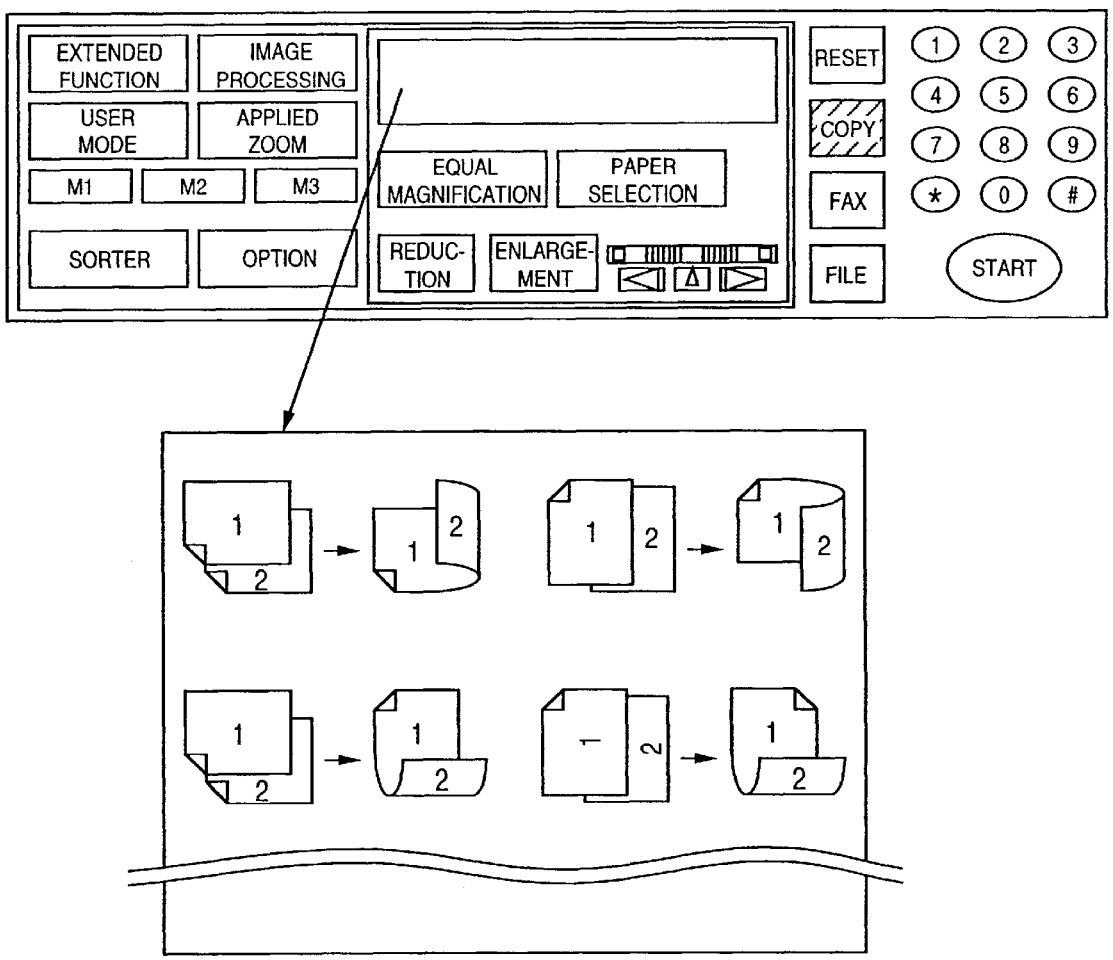

When the operator selects a two-sided copying mode (designated by an extended function button) or a reduced-scale layout from a control panel shown in FIG. 23A, the layouts shown in FIGS. 19A to 22D are displayed on the control panel, as shown in FIG. 23B. The operator places originals on the platen according to the direction of originals to be placed on the platen displayed on the left-hand side of an arrow while observing a desired layout. Thereafter, the operator can start copying to obtain the result displayed on the right-hand side of the arrow in FIGS. 19A to 22D.

Figure 25A:
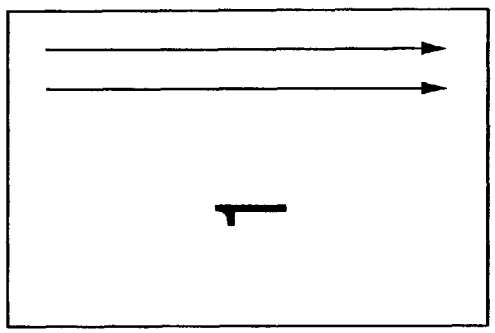
FIGS. 25A to 25D are views showing the read state of images from a page memory in the third embodiment.
Figure 25B:
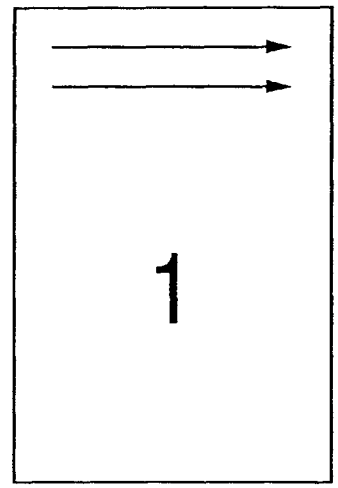
Figure 25C:
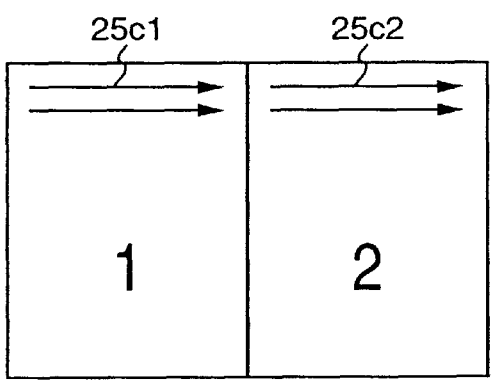
Figure 25D:
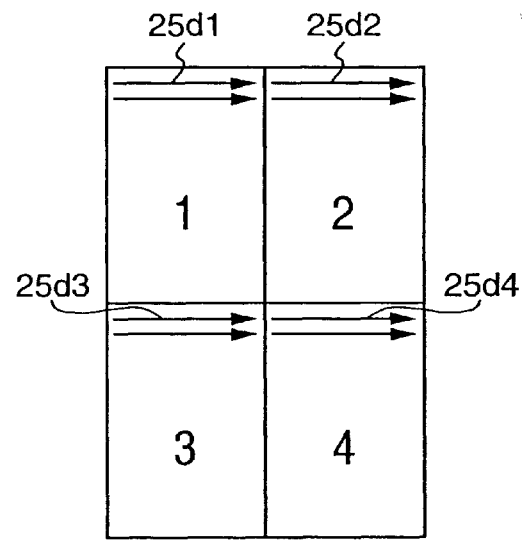

Note that image signals of the read originals are written in the page memory 312 by the variable magnification circuit 304, as shown in FIGS. 25A to 25D, and are read out by the γ conversion circuit 305 in their write order. FIG. 25A shows a case wherein originals are placed on the platen at the horizontally elongated position in the equal-magnification mode. In this case, data are written in and read out from the page memory 312, as indicated by arrows. FIG. 25B shows a case wherein originals are placed at the vertically elongated position in the equal-magnification mode. FIG. 25C shows the case of a 2-in-1 layout. The first page of originals is read and reduced, and is written in the page memory 312, as indicated by arrows 25c1. Subsequently, the second page is read and reduced, and is written in the page memory 312, as indicated by arrows 25c2. When the two pages of originals are written in the page memory 312 as image signals for one page, the image signals are read out from the page memory 312 in the same order as the write order and are printed out. FIG. 25D shows the case wherein a 4-in-1 layout is designated. As in the first embodiment, originals are read and reduced in the order from the first page, and image signals up to the fourth page are written in the page memory 312 in the order from the upper left position to the lower right position, as indicated by arrows 25d1 to 25d4. The written image signals are read out in the same order as the write order.

Furthermore, since there are four different document styles, as shown in FIGS. 15A to 15C, if layouts corresponding to different writing directions of characters (vertical writing, horizontal writing) are added to the displayed layouts to inform the operator of more detailed layouts. In this manner, the operability can be further improved.

Moreover, when the copying apparatus has a document feeder for successively reading originals, a display unit may be arranged on the feeder, as shown in FIG. 24, and the layouts shown in FIGS. 19A to 22D may be displayed on that display unit. With this arrangement, the operator can set originals on the document feeder while observing a desired layout.

When the document feeder shown in FIG. 24 can read a two-sided original, layouts for the two-sided copying mode are also displayed to further improve convenience. When the copying apparatus has a stapling function, the operator can be informed of the stapling positions as well.

With the above-mentioned arrangement, the copying apparatus of the third embodiment helps the user in easily understanding the relationship between the setting positions of originals and desired copy results before copying. The same applies to the apparatus using the feeder. Such apparatus is especially helpful in the reduced-scale or two-sided layout copying mode.

As a result, copying errors that images cannot be output in a desired layout in the two-sided copying mode or reduced-scale layout mode can be prevented, and the apparatus of this embodiment contributes to efficient copying and resource savings.

As described above, with an image forming apparatus and method according to the first to third embodiments of the present invention, when the user selects a layout for the output document, original images are read and output in the selected layout. Furthermore, when the direction of an original is automatically detected, the operator can output images in a desired layout regardless of the direction of the original.

Furthermore, when the relationship between the setting positions of originals and output layouts is displayed in advance to inform the user of it, the user can understand the layout relationship between the originals and outputs without requiring any complicated processing, thus preventing errors.

Fourth Embodiment

Figure 26:
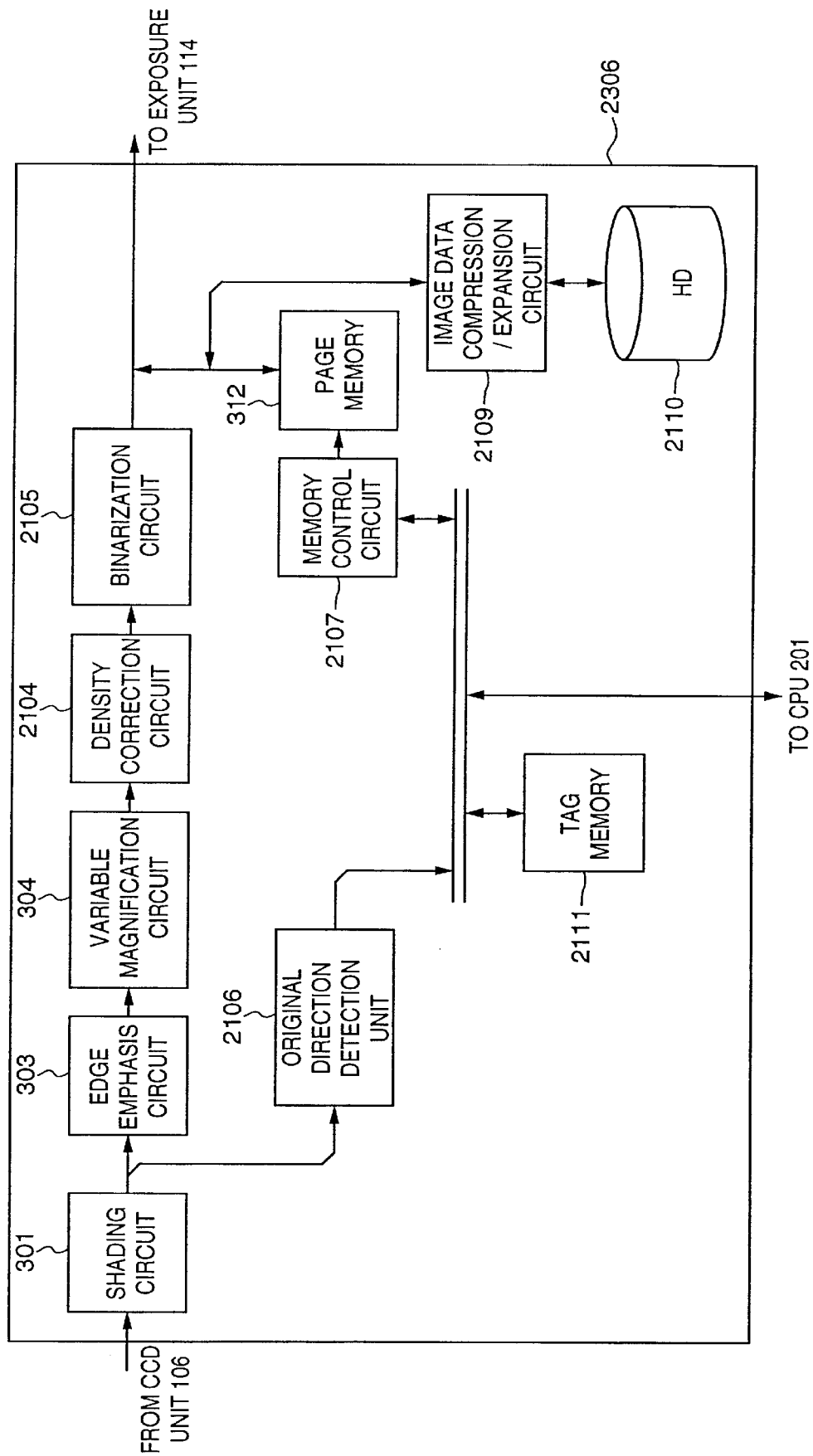
FIG. 26 is a block diagram showing the arrangement of an image processor according to the fourth embodiment of the present invention in detail.

In a copying apparatus of the fourth embodiment, an arrangement that can output images in the original direction and writing direction of characters designated by the user is added to the image processor 206 in addition to the arrangement for recognizing the original direction and rotating images added in the second embodiment and, hence, the image processor has an arrangement, as shown in FIG. 26.

Note that the same reference numerals in FIG. 26 denote the same parts as those in the image processor in FIG. 12, and a detailed description thereof will be omitted.

FIG. 26 is a block diagram showing the arrangement of the image processor of the fourth embodiment in detail.

Referring to FIG. 26, an image signal output from the variable magnification circuit 304 is converted into a desired density signal by a density correction circuit 2104, and the density signal is binarized by a binarization circuit 2105. Note that a simple binarization method, screen method, error diffusion method, or any other methods may be used as the binarization method. Furthermore, the binary image signal is supplied to the exposure unit 114 or is held in the page memory 312.

Reference numeral 2109 denotes an image signal compression/expansion circuit; and 2110, a large-capacity memory implemented by a hard disk. The image signal stored in the page memory 312 is compressed by the image signal compression/expansion circuit 2109 to reduce its information volume, and thereafter, the compressed signal is sequentially stored in the large-capacity memory 2110. Originals set on the copying apparatus are fed in turn onto the platen glass 101, are read, and are then supplied to the image signal compression/expansion circuit 2109 via the binarization circuit 2105 and the page memory 312. The image signal compression/expansion circuit 2109 compresses image signals, and supplies the compressed signals to the large-capacity memory 2110. The large-capacity memory sequentially holds a plurality of compressed image signals supplied from the circuit 2109. Furthermore, the compressed image signals held in the large-capacity memory 2110 are sequentially read out and are expanded by the image signal compression/expansion circuit 2109. The expanded image signals are temporarily supplied to the page memory 312, and thereafter, are supplied to the exposure unit 114, thus performing image formation.

The data compression/expansion method in the image signal compression/expansion circuit 2109 is not particularly limited, and any methods may be used. Note that image signals are compressed for the following two merits, i.e., to hold image signals on the large-capacity memory 2110 as much as possible by reducing the information volume per image signal, and to improve the productivity of the copying apparatus by shortening the time required for accessing the large-capacity memory 2110.

The above-mentioned control such as editing for the reduced-scale layout is done on the page memory 312 after image signals are temporarily stored in the page memory 312, and the processed image signals are output to the exposure unit 114. The editing on the page memory is attained by controlling address signals and enable signals to be supplied to the page memory 312 by a memory control circuit 2107.

On the other hand, reference numeral 2106 denotes an original direction detection unit (having a function equivalent to a combination of the document recognition/direction determination unit 215 and the region separation unit 314 in the second embodiment), which detects the placing direction (up, down, right, left) of originals and the writing direction (vertical writing or horizontal writing) of characters on the original. The detection unit 2106 stores the determination result in a TAG memory 2111. Note that the processing executed in the original direction detection unit 2106 has been described in the second embodiment, and a detailed description thereof will be omitted herein.

On the other hand, the CPU 201 reads the determination result stored in the TAG memory 2111, and supplies an instruction to the memory control circuit 2107 on the basis of the result. The memory control circuit 2107 edits image signals on the page memory 312 on the basis of the instruction from the CPU 201. Alternatively, the CPU 201 supplies the placing direction (up, down, right, left) of originals and the writing direction of characters on the original designated based on an instruction of the operator to the memory control circuit 2107, and the memory control circuit 2107 edits image signals on the page memory 312 on the basis of the instruction from the CPU 201.

The arrangement of the control panel 140 of the fourth embodiment will be explained below with reference to FIG. 27.

Figure 27:
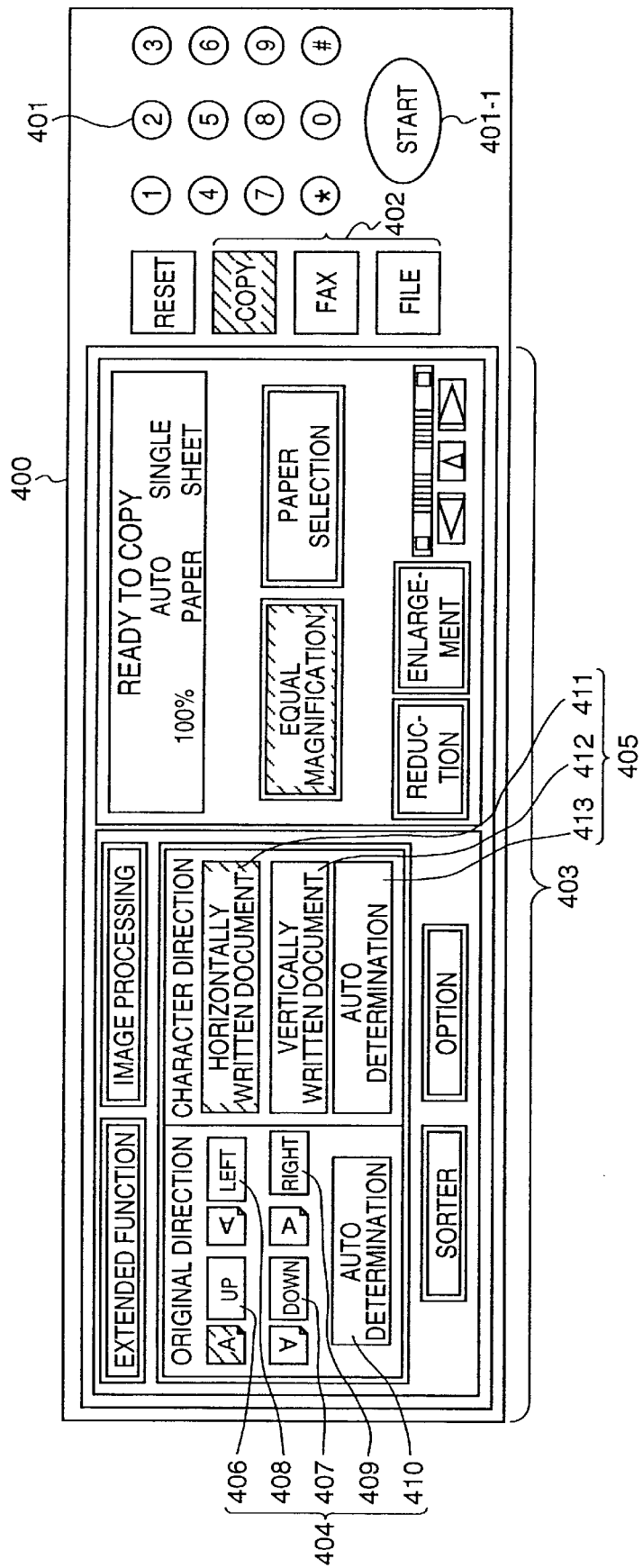
FIG. 27 is a plan view showing the arrangement of a control panel of the fourth embodiment.

FIG. 27 shows the arrangement of the control panel of the fourth embodiment.

In FIG. 27, reference numeral 401 denotes a ten-key pad used for setting required numerical values such as a copy count, and the like; and 401-1, a copy start key used for instructing to start copying. Reference numeral 403 denotes a large-size liquid crystal touch panel, which displays keys on a liquid crystal display. The operator presses the displayed keys with his or her finger to do a desired operation. Reference numerals 404 to 413 denote keys, which relate to the present invention, among those displayed on the liquid crystal touch panel 403. Note that a description of keys that do not directly relate to the present invention will be omitted.

Reference numeral 404 denotes a key group for designating the original direction. The operator uses the key group 404 to designate the original direction with reference to himself or herself. The key group 404 include an up designation key 406, down designation key 407, left designation key 408, right designation key 409, and AUTO (automatic) determination key 410. When the operator selectively presses one of the keys 406 to 410, the selected key is highlighted to indicate the choice being made. In FIG. 27, the up designation key 406 is designated. When one of the keys 406 to 409 is selected, it is determined that originals are placed in the designated direction so as to control the apparatus accordingly. When automatic determination of the original direction is selected by the AUTO (automatic) determination key 410, control is executed assuming that the direction determined by the original direction detection unit 2106 is designated.

Furthermore, reference numeral 405 denotes a key group used for designating the writing direction of characters on the original, i.e., for designating if the original is a vertically written original or horizontally written original. The key group 405 includes a horizontal writing designation key 411, a vertical writing designation key 412, and an AUTO (automatic) determination key 413. When the operator selectively presses one of the keys 411, 412, and 413, the selected key is highlighted to indicate the choice being made. In FIG. 27, the horizontal writing designation key 411 is selected.

When one of the horizontal and vertical writing designation keys 411 and 412 is selected, it is determined that the writing direction of characters on the original is the designated direction so as to control the apparatus accordingly. When automatic determination is selected by the AUTO (automatic) determination key 413, it is determined that the writing direction of characters determined by the original direction detection unit 2106 is designated, and setting is performed accordingly.

Control examples by original direction designation of the fourth embodiment will be explained below with reference to FIG. 28.

Figure 28:
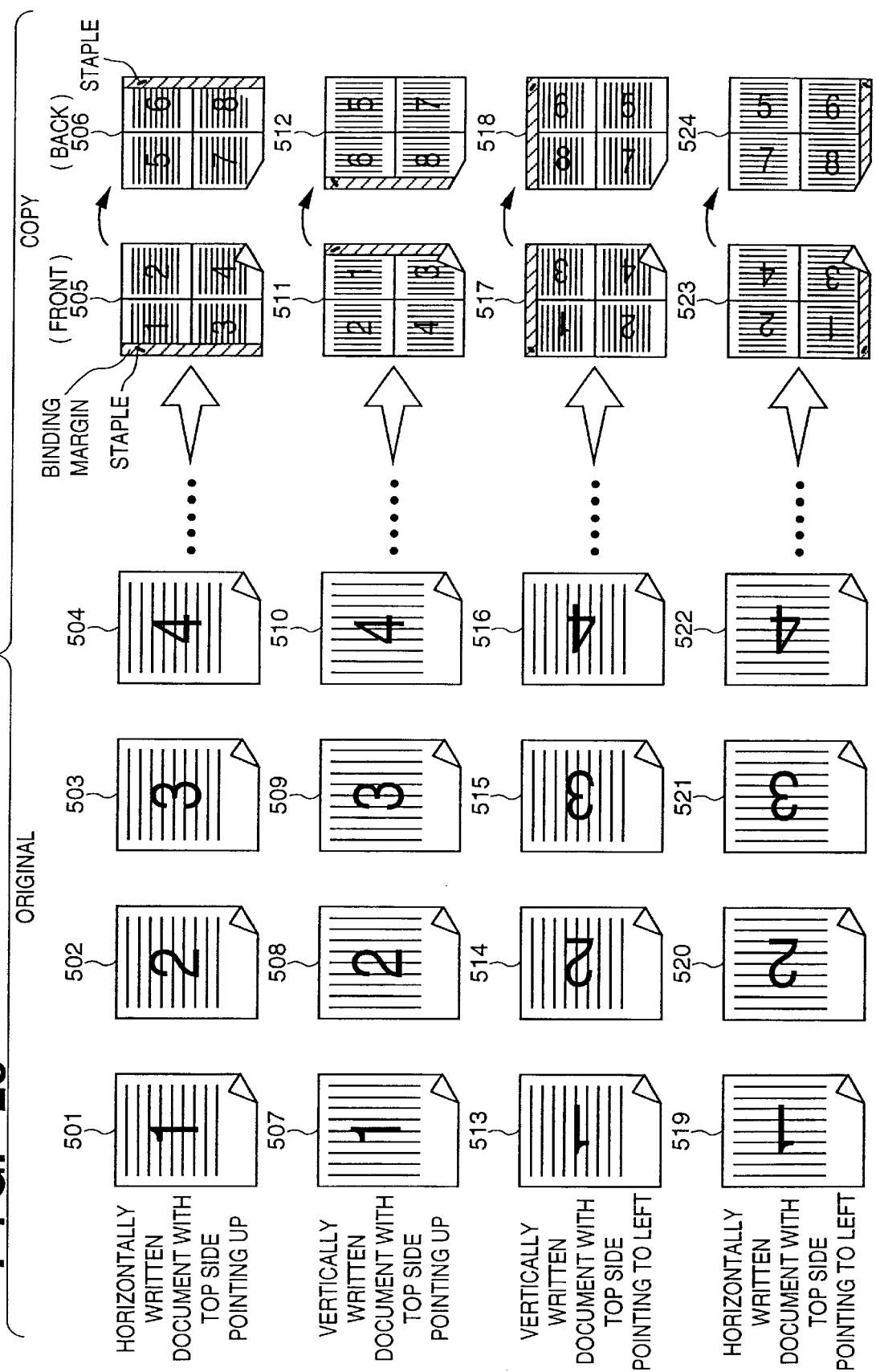
FIG. 28 is a view showing examples of two-sided in the reduced-scale layout copying control in the fourth embodiment.

FIG. 28 shows examples of two-sided in the reduced-scale layout copying control of the fourth embodiment.

The control of the fourth embodiment to be described below with the aid of FIG. 28 is done as editing of image signals on the page memory 312 under the control of the memory control circuit 2107 on the basis of an instruction from the CPU 201. That is, the layout, binding margin, stapling position, and the like are controlled on the basis of the placing direction of originals and vertical writing/horizontal writing designated upon operation on the control panel 140.

In FIG. 28, reference numerals 501, 502, 503, 504, . . . denote a plurality of horizontally written originals placed with their top side pointing up. When these originals are set on the copying machine in the illustrated direction, original images are copied in a layout 505 on the front side and in a layout 506 in the back side to have a binding margin, and copies are bound at a desired position. Note that "1", "2", "3", "4", . . . , "8" in FIG. 28 correspond to the order of originals, i.e., the pages of originals.

Reference numerals 507, 508, 509, 510, . . . denote a plurality of vertically written originals placed with their top side pointing up. When these originals are set on the copying machine in the illustrated direction, original images are copied in a layout 511 on the front side and in a layout 512 in the back side to have a binding margin, and copies are bound at a desired position.

Similarly, in the case of vertically written originals 513, 514, 515, 516, . . . which are placed with their top side pointing to the left, original images are copied in a layout 517 on the front side and in a layout 518 in the back side to have a binding margin, and copies are bound at a desired position. Likewise, in the case of horizontally written originals 519, 520, 521, 522, . . . which are placed with their top side pointing to the left, original images are copied in a layout 523 on the front side and in a layout 524 in the back side to have a binding margin, and copies are bound at a desired position.

Note that a description of combinations not shown in FIG. 28, e.g., originals placed with their top side pointing down, will be omitted. Similarly, the layout, binding margin, stapling position, and the like are controlled in accordance with the designated placing direction of originals and vertical writing/horizontal writing.

The processing in the hard disk 2110 and the TAG memory 2111 in the fourth embodiment will be described below with reference to FIGS. 29 and 30.

Figure 29:
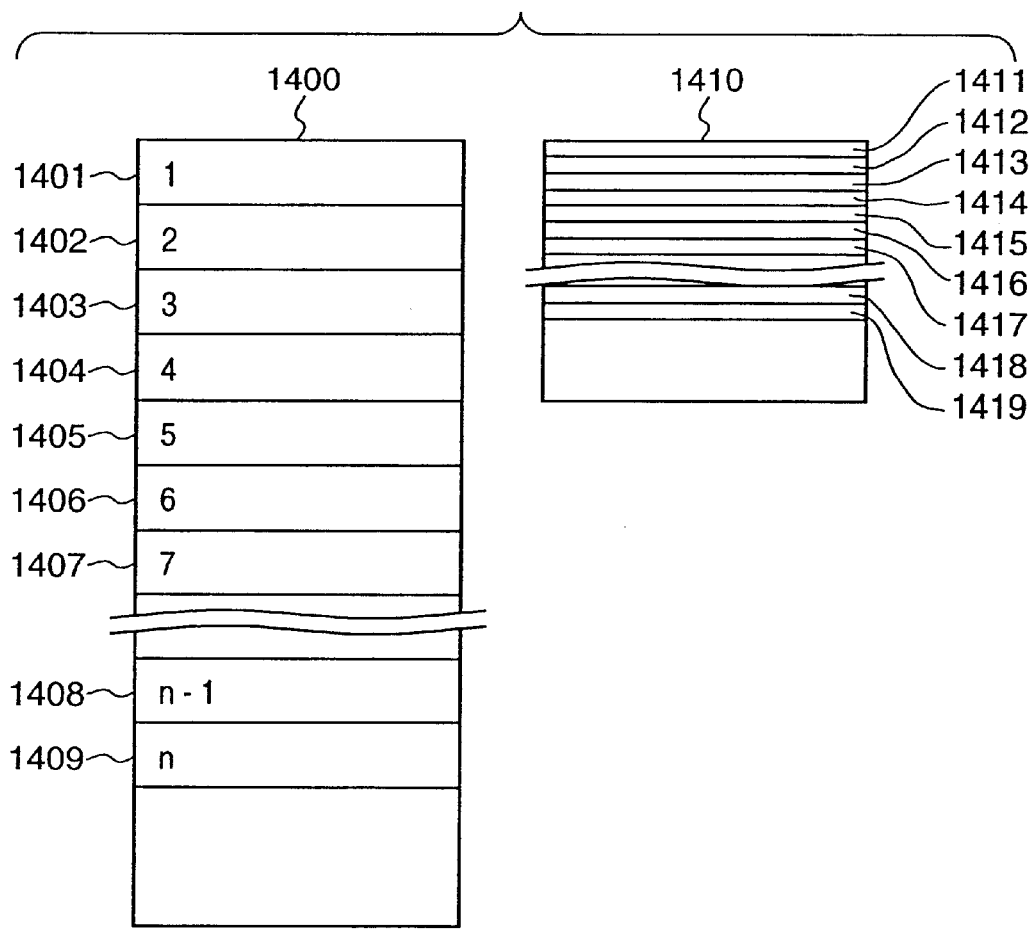
FIG. 29 is a view for explaining processing in a hard disk 110 and a TAG memory 111 of the fourth embodiment.
Figure 30:
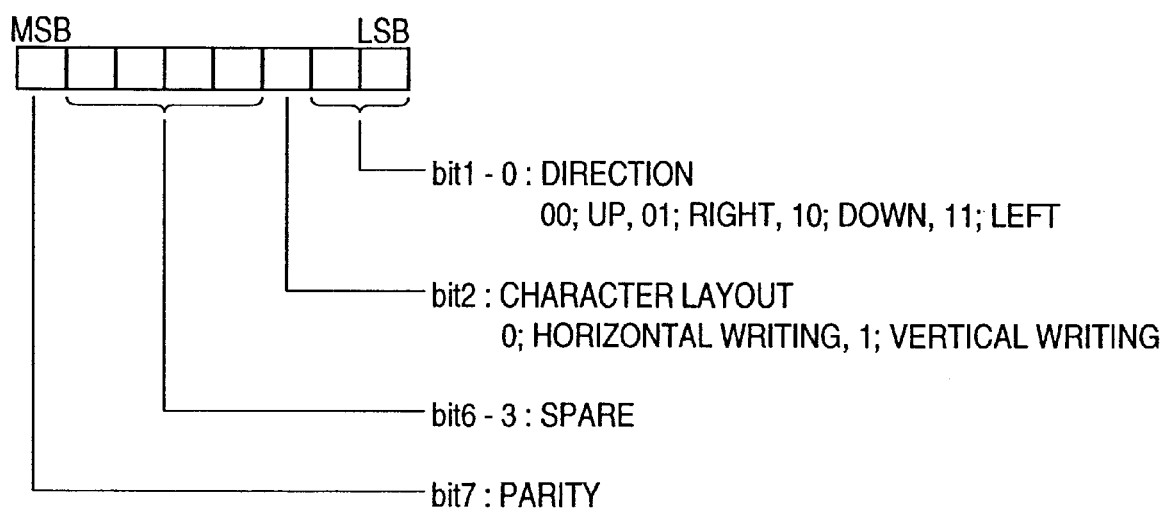
FIG. 30 is a view for explaining processing in the hard disk 110 and the TAG memory 111 of the fourth embodiment.

FIGS. 29 and 30 are views for explaining the processing in the hard disk 2110 and the TAG memory 2111 in the fourth embodiment.

In FIG. 29, reference numeral 1400 denotes an address map in an effective use area of the hard disk 2110. Assume that the hard disk 2110 stores image signals for n pages. More specifically, reference numerals 1401, 1402, 1403, 1404, 1405, 1406, 1407, 1408, and 1409 respectively denote image signals for the first, second, third, fourth, fifth, sixth, seventh, (n−1)-th, and n-th pages, with some middle signals being omitted.

On the other hand, reference numeral 1410 denotes an address map in an effective use area in the TAG memory 2111. The TAG memory 2111 holds the directions of a plurality of originals set on the copying apparatus. More specifically, reference numerals 1411, 1412, 1413, 1414, 1415, 1416, 1417, 1418, and 1419 respectively denote original directions of the first, second, third, fourth, fifth, sixth, seventh, (n−1)-th, and n-th pages, with directions of some middle pages being omitted.

Note that the image signals held in the hard disk 2110 and the original directions held in the TAG memory 2111 are stored in the same order to have one-to-one correspondence therebetween. Each original direction in the TAG memory 2111 in FIG. 29 is 8-bit data, and is held, as shown in FIG. 30. More specifically, among 8 bits, bit 1 and bit 0 hold the up, down, right, or left original direction: 00 indicating up, 01; right, 10; down, and 11; left. Similarly, bit 2 holds whether the original is a vertically or horizontally written original: if bit 2 is 0, it indicates horizontal writing; if bit 2 is 1, it indicates vertical writing. On the other hand, four bits from bit 6 to bit 3 are spare bits, and bit 7 as the MSB is a parity check bit.

As described above, in the hard disk 2110 and TAG memory 2111, the image signals and original directions have one-to-one correspondence therebetween. For this reason, the CPU 201 need only access a small address space on the TAG memory 2111 without accessing a large address space on the hard disk 2110, so as to access the corresponding address on the hard disk 2110, thus contributing to improvement of the productivity of the apparatus.

As described above, according to the fourth embodiment, when a plurality of original images obtained by reading a plurality of originals are, for example, reduced and formed on a single recording medium, the user can designate desired forming positions and directions of original images, a binding margin, and stapling position, thus realizing practical original image formation.

Fifth Embodiment

In the fifth embodiment to be described below, the present invention is applied to a full-color copying apparatus.

The schematic arrangement of the full-color copying apparatus of the fifth embodiment will be described below with reference to FIG. 31.

Figure 31:
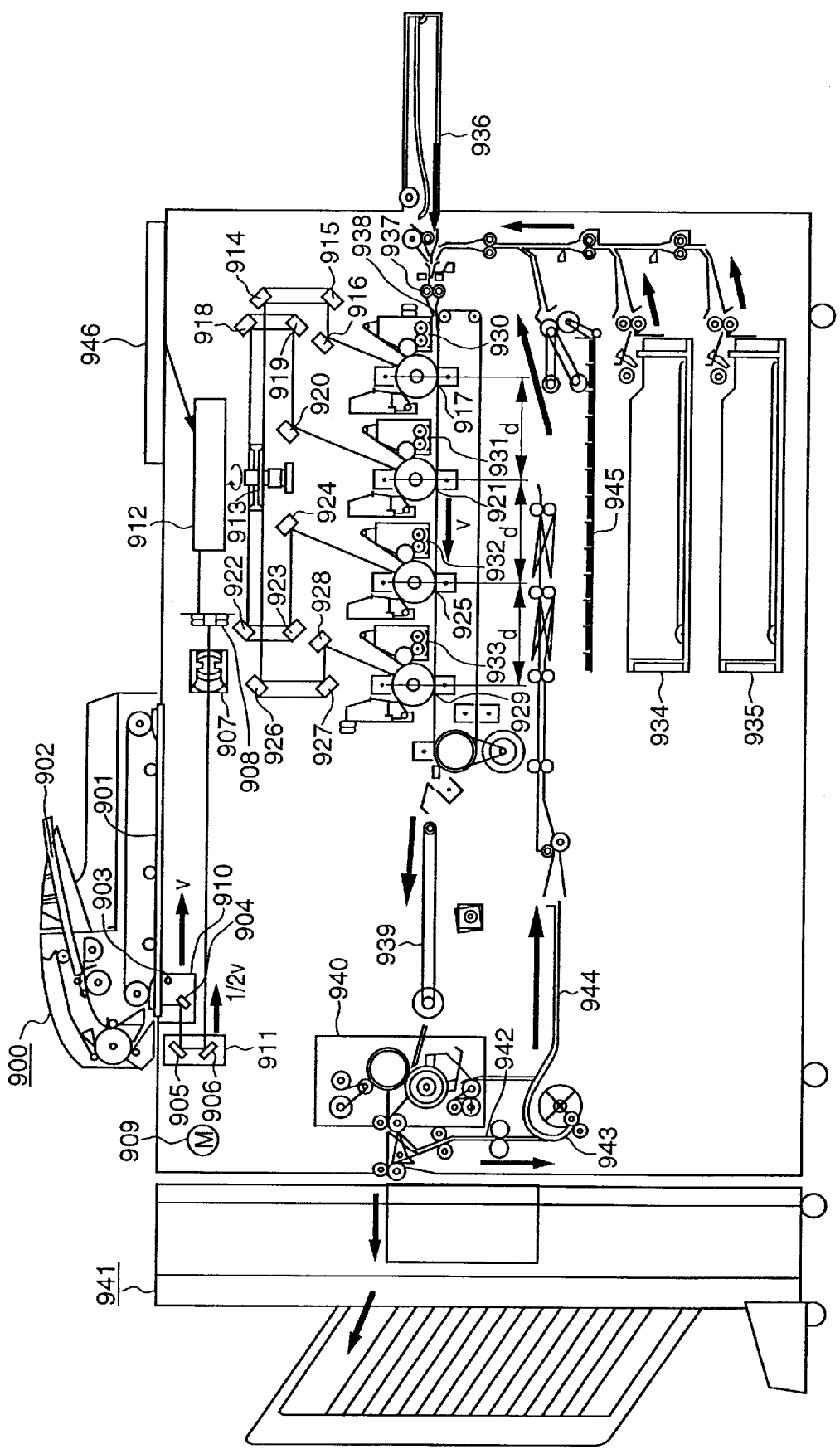
FIG. 31 is a schematic sectional view showing the arrangement of a full-color copying apparatus according to the fifth embodiment of the present invention.

FIG. 31 is a schematic sectional view showing the arrangement of the full-color copying apparatus of the fifth embodiment.

In FIG. 31, reference numeral 900 denotes an automatic document feeder (to be referred to as a DF hereinafter) which can automatically feed a plurality of originals one by one, and can sequentially set the front and back surfaces of each original on a platen 901. Since the detailed arrangement of the DF is already known to those who are skilled in the art, a detailed description thereof will be omitted. A plurality of originals 902 to be read are set on the DF 900. The originals 902 set on the DF 900 are fed one by one by the DF 900, and each original is placed on the platen 901. The original 902 on the platen 901 is illuminated by an illumination lamp 903, and light reflected by the original 902 forms an image on a CCD (or CCD sensor) 908 by an optical system 907 via mirrors 904, 905, and 906. Furthermore, a first mirror unit 910 including the mirror 904 and the illumination lamp 903 is mechanically driven by a motor 909 at a velocity V. On the other hand, a second mirror unit 911 including the mirrors 905 and 906 is driven at a velocity ½V to scan the entire surface of the original 902.

Reference numeral 912 denotes an image processor for processing read image information as an electrical signal, temporarily holding the electrical signal on an image memory, and outputting the held signal as a print signal. The print signal output from the image processor 912 is supplied to a laser driver (not shown) to drive four semiconductor lasers (not shown). Reference numeral 913 denotes a polygonal mirror, which receives four laser beams emitted by the four semiconductor lasers (not shown).

Among the four laser beams, one laser beam scans a photosensitive drum 917 via mirrors 914, 915, and 916. The next laser beam scans a photosensitive drum 921 via mirrors 918, 919, and 920. The next laser beam scans a photosensitive drum 925 via mirrors 922, 923, and 924. The last laser beam scans a photosensitive drum 929 via mirrors 926, 927, and 928.

Reference numeral 930 denotes a developer for supplying yellow (Y) toner. The developer 930 forms a yellow toner image on the photosensitive drum 917 in accordance with the laser beam. Reference numeral 931 denotes a developer for supplying magenta (M) toner. The developer 931 forms a magenta toner image on the photosensitive drum 921 in accordance with the laser beam. Reference numeral 932 denotes a developer for supplying cyan (C) toner. The developer 932 forms a cyan toner image on the photosensitive drum 925 in accordance with the laser beam. Reference numeral 933 denotes a developer for supplying black (Bk) toner. The developer 933 forms a black toner image on the photosensitive drum 929 in accordance with the laser beam.

The above-mentioned four-color (Y, M, C, Bk) toner images are transferred onto a paper sheet to obtain a full-color output image.

A paper sheet supplied from one of paper cassettes 934 and 935 and a manual insertion tray 936 is chucked on and conveyed by a transfer belt 928 via registration rollers 937. The individual color toner images are formed on the photosensitive drums 917, 921, 925, and 929 in advance in synchronism with the paper feed timings, and are transferred onto the paper sheet as the paper sheet is conveyed.

The paper sheet on which the color toner images have been transferred is peeled, and is conveyed by a conveyor belt 939. The toner images are fixed on the paper sheet by a fixing device 940, and the paper sheet is exhausted onto a sorter/stapler 941 in a single-sided copying mode, or is exhausted onto a two-sided path 942 in a two-sided copying mode.

In the two-sided copying mode, the paper sheet exhausted form the fixing device 940 onto the two-sided path 942 is reversed by a reversing path 943, and is held on a two-sided tray 945 via a convey portion 944. The paper sheet held on the two-sided tray 945 is fed again, and is chucked on and conveyed by the transfer belt 938 via the registration rollers 937 so as to form images on the back surface. The individual color toner images are formed on the photosensitive drums 917, 921, 925, and 929 in advance in synchronism with the paper feed timings, and are transferred onto the paper sheet as the paper sheet is conveyed. Thereafter, the paper sheet is peeled and is conveyed by the conveyor belt 939. Finally, the toner images are fixed on the paper sheet by the fixing device 940, and the paper sheet is exhausted onto the sorter/stapler 941 as in the single-sided copying mode.

The sorter/stapler 941 can sort and staple exhausted copies. Since the detailed arrangement of the sorter/stapler 941 are known to those who are skilled in the art, a description thereof will be omitted.

Reference numeral 946 denotes a console, which is equivalent to the control panel 140 of the fourth embodiment. Hence, a detailed description of the console 946 will be omitted.

The detailed arrangement of the image processor 912 in the fifth embodiment and the flow of an image signal in the image processor 912 will be explained below with reference to FIG. 32.

Figure 32:
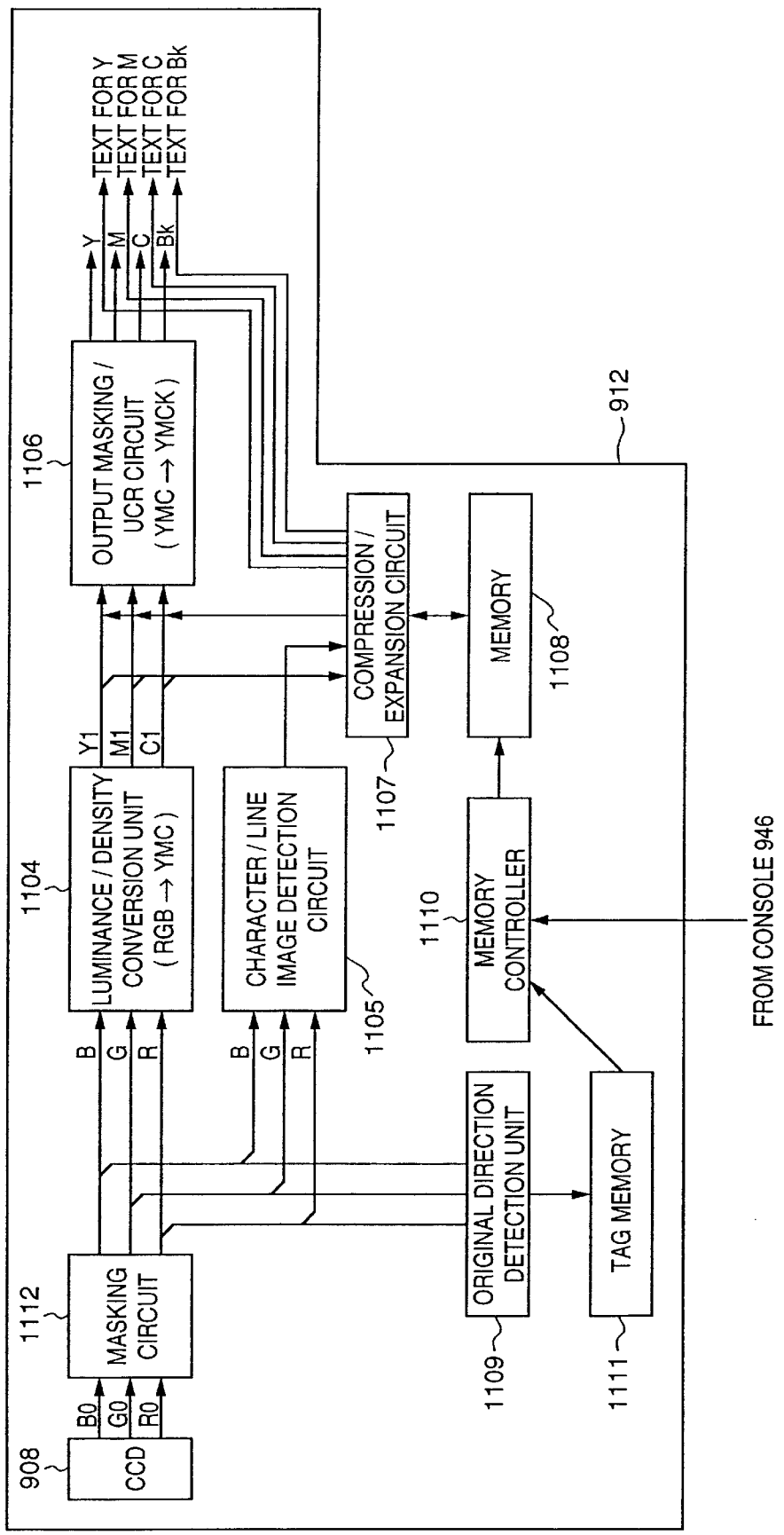
FIG. 32 is a block diagram showing the arrangement of an image processing circuit unit of the fifth embodiment.

FIG. 32 is a block diagram showing the arrangement of the image processor of the fifth embodiment in detail.

Image information read from the CCD sensor 908 is output as digital signals in units of three color components, i.e., red (R), green (G), and blue (B). Reference numeral 1012 denotes a masking circuit which converts input (R0, G0, B0) signals into standard (R, G, B) signals by a calculation given by the following equation (1):

$$\begin{bmatrix} R \\ G \\ B \end{bmatrix} = \begin{bmatrix} c11 & c12 & c13 \\ c21 & c22 & c23 \\ c31 & c32 & c33 \end{bmatrix} \begin{bmatrix} R0 \\ B0 \\ G0 \end{bmatrix} \quad (1)$$

where Cij (i=1, 2, 3, j=1, 2, 3) is a constant inherent to the apparatus in consideration of various characteristics such as the sensitivity characteristics of the CCD sensor 908, the spectrum characteristics of the illumination lamp, and the like.

Reference numeral 1104 denotes a luminance/density conversion unit which comprises a RAM or ROM look-up table, and converts standard (R, G, B) signals into (C1, M1, Y1) signals by calculations given by the following equations (2):

$$C1 = -K \times \log 10(R/255)$$

$$M1 = -K \times \log 10(G/155)$$

$$Y1 = -K \times \log 10(B/255) \qquad (2)$$

Reference numeral 1106 denotes an output masking/UCR circuit which converts (C1, M1, Y1) signals into (C, M, Y, Bk) signals as toner colors of the full-color copying apparatus by a calculation given by the following equation (3):

$$\begin{bmatrix} C \\ M \\ Y \\ Bk \end{bmatrix} = \begin{bmatrix} a11 & a21 & a31 & a41 \\ a12 & a22 & a32 & a42 \\ a13 & a23 & a33 & a43 \\ a14 & a24 & a34 & a44 \end{bmatrix} \begin{bmatrix} C1 \\ M1 \\ Y1 \\ Bk1 \end{bmatrix} \qquad (3)$$

where aij (i=1, 2, 3, 4, j=1, 2, 3, 4) is a constant in consideration of various color tone characteristics of toners, and also, Bk1 is given by:

$$Bk1 = \min(C1, M1, Y1) \qquad (4)$$

Based on equations (2), (3), and (4) above, (R, G, and B) signals read by the CCD sensor 908 are converted into (C1, M1, Y1) signals, and the (C1, M1, Y1) signals are converted into (C, M, Y, Bk) signals, which are output to the laser driver (not shown).

Reference numeral 1105 denotes a character/line image detection circuit which determines if each pixel in an original image is a portion of a character or line image, and outputs a character/line image determination signal TEXT on the basis of the determination result. Note that a detailed description of the character/line image detection circuit 1105 will be omitted since it can be implemented using a known character/line image detection circuit.

Reference numeral 1107 denotes a compression/expansion circuit which compresses (R, G, and B) signals and the character/line image determination signal TEXT to reduce their information volumes, and then stores the compressed signals on a memory 1108. At the same time, the compression/expansion circuit 1107 expands image signal signals read out from the memory 1108 into (R, G, and B) signals and the character/line image determination signal TEXT. Note that a detailed description of the compression/expansion circuit 1107 will be omitted since it can be implemented using a known compression/expansion circuit.

Image signals read by the CCD 908 are compressed by the image compression/expansion circuit 1107 via the masking circuit 1112 and the luminance/density conversion unit 1104, and the compressed image signals are written in the memory 1108. Also, the character/line image determination signal TEXT determined by the character/line image determination circuit 1105 is compressed by the image compression/expansion circuit 1107, and the compressed signal is written in the memory 1108. In this manner, the memory 1108 stores a series of image signals for a plurality of pages.

Reference numeral 1109 denotes an original direction detection unit which is equivalent to the original direction detection unit 2106 in the fourth embodiment, and detects the direction of the read original. That is, the detection unit 1109 determines if the original is placed with its top side pointing up or down, or to the right or left and if the original is a vertically or horizontally written one, and outputs the determination result. The detection unit 1109 writes the output result in a TAG memory 1111 equivalent to the TAG memory 2111 in the fourth embodiment. As in the fourth embodiment, image signals held in the memory 1108 and detected information held in the TAG memory 1111 have one-to-one correspondence therebetween in units of pages.

Reference numeral 1110 denotes a memory controller, which reads out the detection result of the original direction detection unit 1109 from the TAG memory 1111. Alternatively, the memory controller 1110 controls the layout of image signals when image signals are written in the memory 1108 on the basis of the original direction and writing direction of characters designated at the console 956. That is, the memory controller 1110 executes write position control and transposition control by controlling the initial value and UP/DOWN of an address counter upon writing an image signal.

Furthermore, image signals read out from the memory 1108 are expanded by the image compression/expansion circuit 1107, and the expanded signals are sent to the laser driver via a PWM circuit (not shown) in accordance with the image formation timings of the copying apparatus. The timing chart at that time will be explained below with the aid of FIG. 33.

FIG. 33 is a timing chart of image signals output from the image processor of the fifth embodiment.

In FIG. 33, image signals read by the CCD 908 are written in the memory 1108 at a timing 11010. The image signals written on the memory 1108 are read out at timings 11020, 11030, 11040, and 11050. The timings 11020, 11030, 11040, and 11050 are defined, so that the individual image signals are read out at time intervals d/v. Note that d is the interval between adjacent ones of the four drums arranged at equal intervals, and v is the velocity of a paper sheet conveyed by the conveyor belt.

The detailed arrangement of the original direction detection unit 1109 and the processing in the original direction detection unit 1109 will be explained below with reference to FIG. 34.

FIG. 34 is a block diagram showing the arrangement of the original direction detection unit of the fifth embodiment in detail.

Referring to FIG. 34, R, G, and B signals as image signals based on the read original are subjected to ND conversion (monochrome conversion), decimation, and binarization by a decimation circuit 1301 to sufficiently reduce their information volumes, and thereafter, the processed signals are held in a memory 1302. A CPU 1303 accesses the image information held in the memory 1302 to determine the original direction and vertical writing/horizontal writing.

Since the practical determination method can use a state-of-the-art technique, a description thereof will not be made herein. The determination result is expressed by, e.g., a total of 3 bits, i.e., a 2-bit code representing the original direction (up, down, right, left), and a 1-bit code representing if the original is a vertically or horizontally written one. Furthermore, since some originals cannot be detected and detection errors cannot be perfectly avoided, the directions of all the plurality of originals fed by the DF 900 are detected in the fifth embodiment. Among the plurality of detection results, the direction in the majority is determined as a detection result, thus improving the detection precision.

Control examples based on original direction designation of the fifth embodiment will be explained below.

The two-sided in the reduced-scale layout copying control of the fifth embodiment is done as editing of image signals on the memory 1108 under the control of the memory controller 1110 based on an instruction from the CPU 1303. That is, the layout, binding margin, stapling position, and the like of images are controlled in accordance with the placing direction of originals and vertical writing/horizontal writing designated upon operation on the console 946.

Note that the control examples of the fifth embodiment are substantially the same as those described above with the aid of FIG. 28 in the fourth embodiment, except that they are applied to the full-color copying apparatus, and a detailed description thereof will be omitted.

As described above, according to the fifth embodiment, the effects described in the fourth embodiment can be obtained in the full-color copying machine.

As described above, according to the fourth and fifth embodiments of the present invention, an image forming apparatus and method which can form a plurality of original images obtained by reading a plurality of originals on a recording medium in a practical layout can be provided.

[Sixth Embodiment]

In the sixth embodiment, a copying apparatus which can determine the character direction of an original will be explained. The arrangement of the copying apparatus is the same as that of the first embodiment shown in FIG. 5, and the functional arrangement of the copying apparatus as the characteristic feature of the sixth embodiment will be especially explained below.

Figure 35:
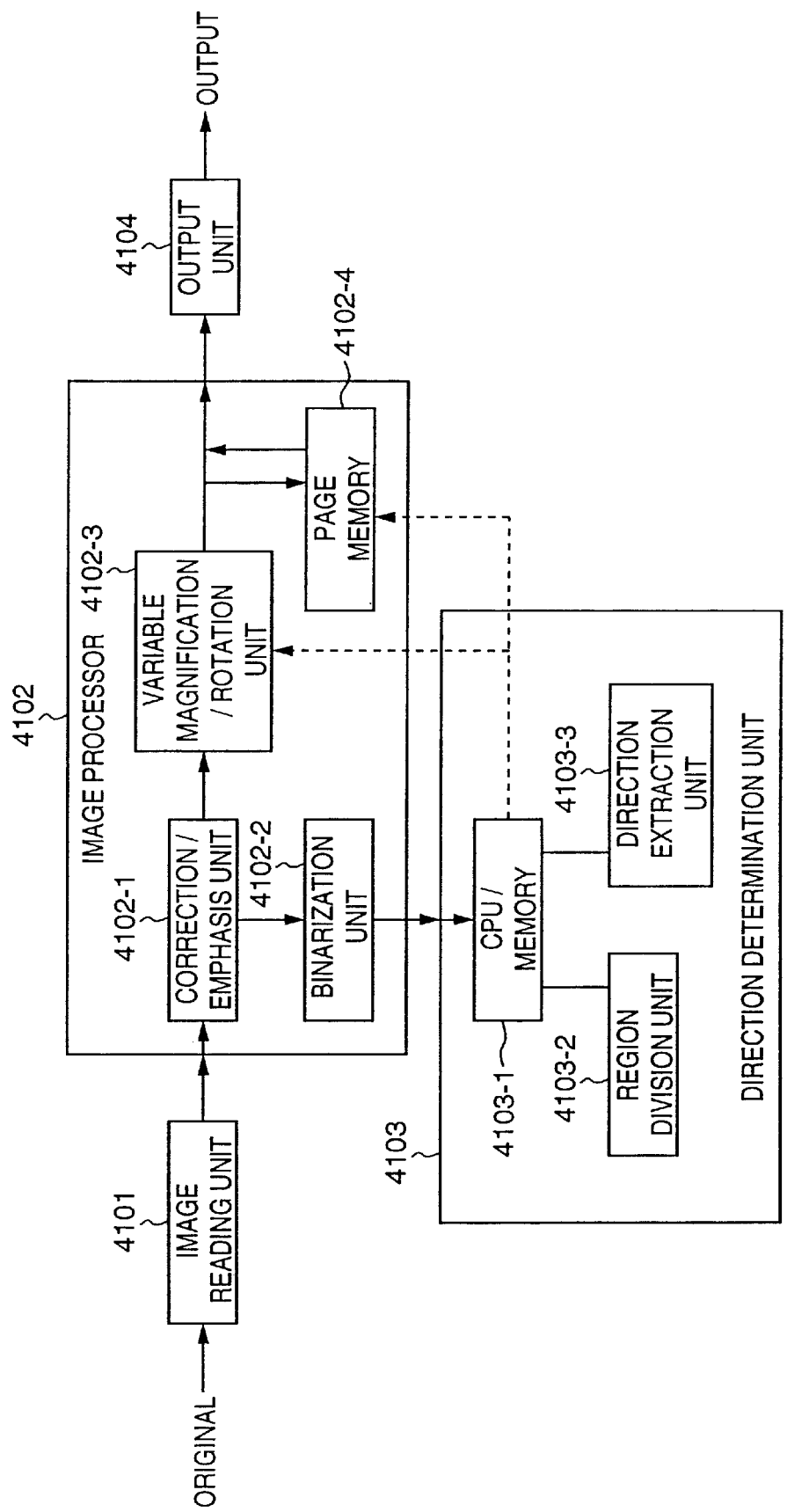
FIG. 35 is a block diagram showing the functional arrangement of a copying apparatus according to the sixth embodiment of the present invention.

FIG. 35 is a block diagram showing the functional arrangement of a copying apparatus according to the sixth embodiment.

The apparatus shown in FIG. 35 comprises an image reading unit 4101 for reading an image from an original, an image processor 4102 including a correction-emphasis unit 4102-1, a binarization unit 4102-2, a variable magnification-rotation unit 4102-3, and a page memory 4102-4; a direction determination unit 4103 which includes a CPU/memory unit 4103-1, a region division unit 4103-2, and a direction extraction unit 4103-3, and determines the direction of an image signal received from the image processor 4102; and an output unit 4104 for outputting a predetermined image.

Figure 36:
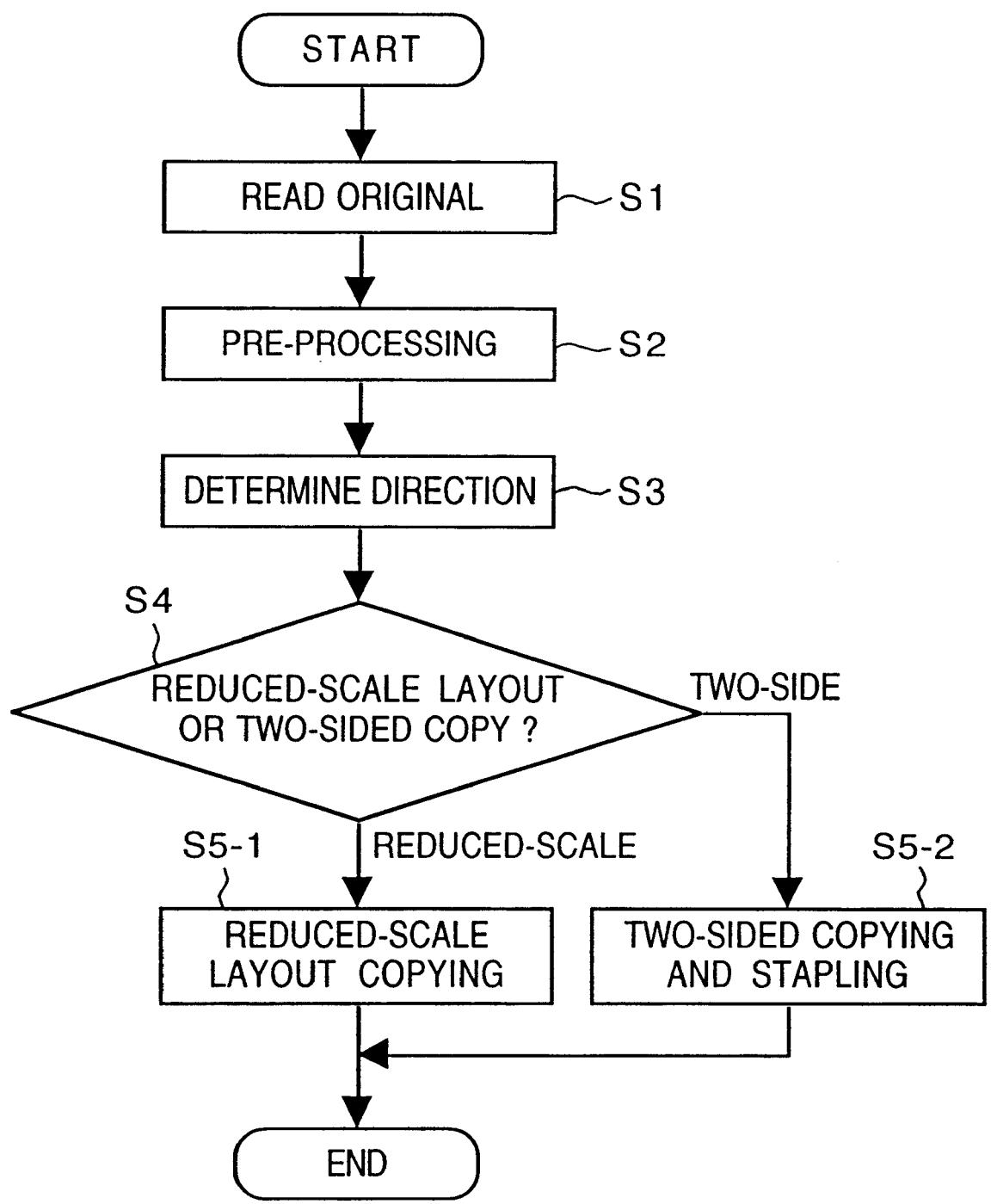
FIG. 36 is a flow chart showing the sequence of image forming processing in the copying apparatus according to the sixth embodiment.

FIG. 36 is a flow chart showing the sequence of the image forming processing in the copying apparatus according to the sixth embodiment.

In step S1 in FIG. 36, the image reading unit 4101 exposes an original placed on a platen (not shown), and a CCD unit (not shown) in the image reading unit 4101 photoelectrically converts light reflected by the original into an image signal. In step S2, the image processor 4102 performs correction and emphasis of the image signal using the correction-emphasis unit 4102-1, and generates a binary image signal using the binarization unit 4102-2 to use it in direction determination.

In step S3, the direction determination unit 4103 determines the reading direction of the original. In the direction determination unit 4103, the CPU/memory unit 4103-1 receives the binary image signal. The region division unit 4103-2 extracts a text region, and the direction extraction unit 4103-3 extracts the reading direction of character lines in the extracted text region. Note that the reading direction is a direction to read character in one character line written on an original placed in an arbitrary direction.

FIGS. 37A to 37D show the relationship between different originals and the reading directions of character lines on these originals.

In FIGS. 37A to 37D, a total of four different reading directions of the character lines are determined for originals placed in a total of eight different directions as combinations of vertically and horizontally written originals on the left-hand side of double-headed arrows, as indicated by arrows on the right-hand side of the double-headed arrows in FIGS. 37A to 37D.

Figure 38:
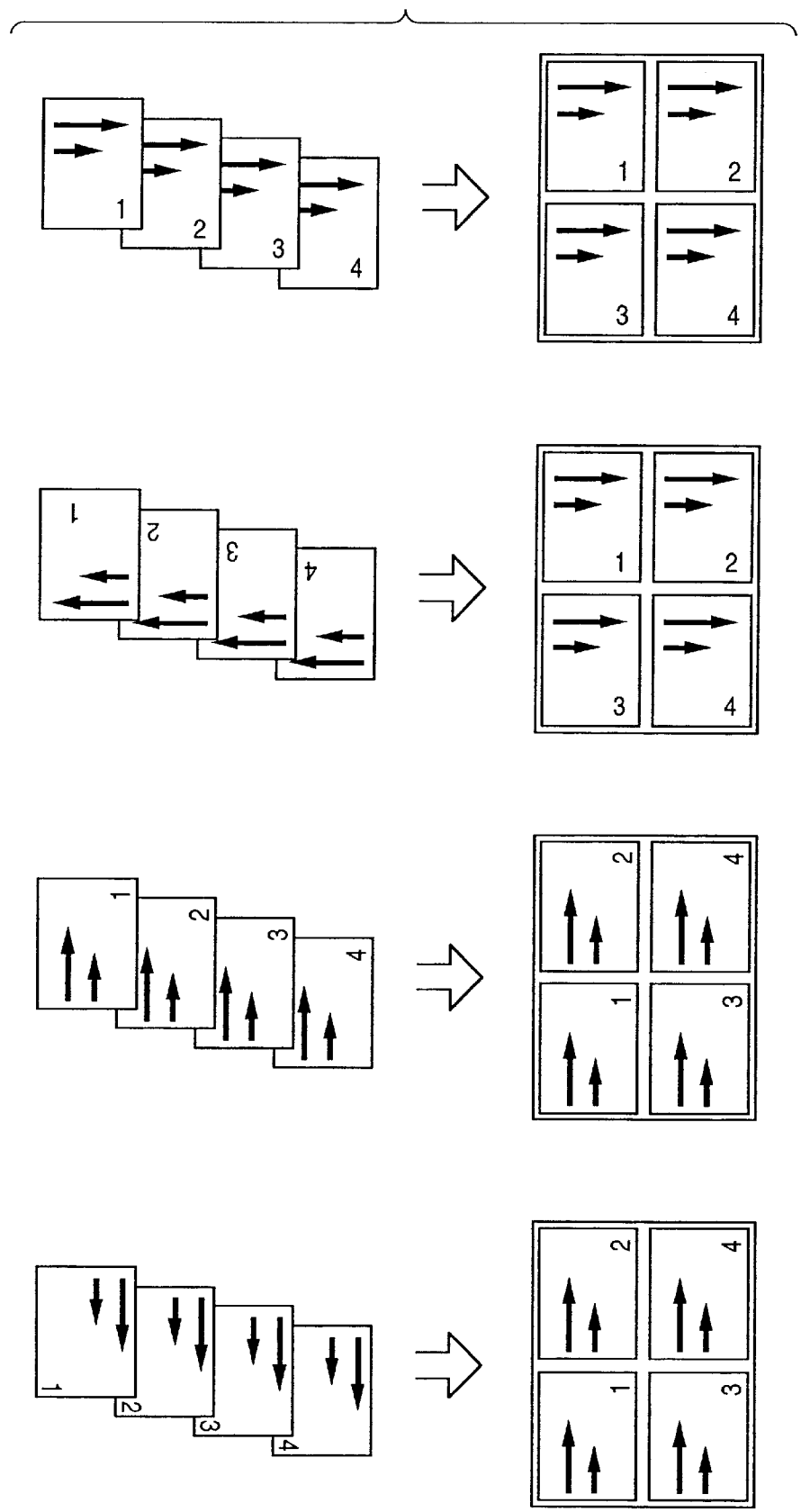
FIG. 38 is a view showing the reduced-scale layouts corresponding to the reading directions.

In step S4, one of the reduced-scaled layout copying mode and two-sided layout copying mode designated in advance by the user is selected. If the reduced-scaled layout copying mode is designated, the image processor 4102 controls its variable magnification-rotation unit 4102-3 in step S5-1 to obtain a reduced-scale layout shown in FIG. 38 in correspondence with the reading direction determined in step S3, and stores the processed result on the page memory 4102-4. The output unit 4104 prints images on the basis of image signals in the page memory 4102-4.

On the other hand, if the two-sided copying and stapling mode is designated in step S4, the image processor 4102 controls its variable magnification-rotation unit 4102-3 in step S5-2 to rotate images on two-sided copies in the directions shown in FIG. 39 in correspondence with the reading direction determined in step S3. The output unit 4104 prints images and staples copies.

The processing contents in the direction determination unit 4103 that builds the copying apparatus according to the sixth embodiment will be described below.

The region division unit 4103-2 in the direction determination unit 4103 shown in FIG. 35 detects black pixels of an input document image signal, and generates rectangular frames of black pixel blocks by contour tracking or labeling. The region division unit 4103-2 discriminates regions where character lines are present, e.g., a title, text, caption, figure region, natural image region, table region, and the like with reference to the black pixel density, the presence/absence of neighboring rectangular blocks, aspect ratio of the rectangle, and the like. Of these regions, a portion where a text is written, i.e., a portion with a series of character lines is extracted as a text region. Note that the extracted character lines are expressed by the coordinates of a circumscribed rectangle.

Figure 40:
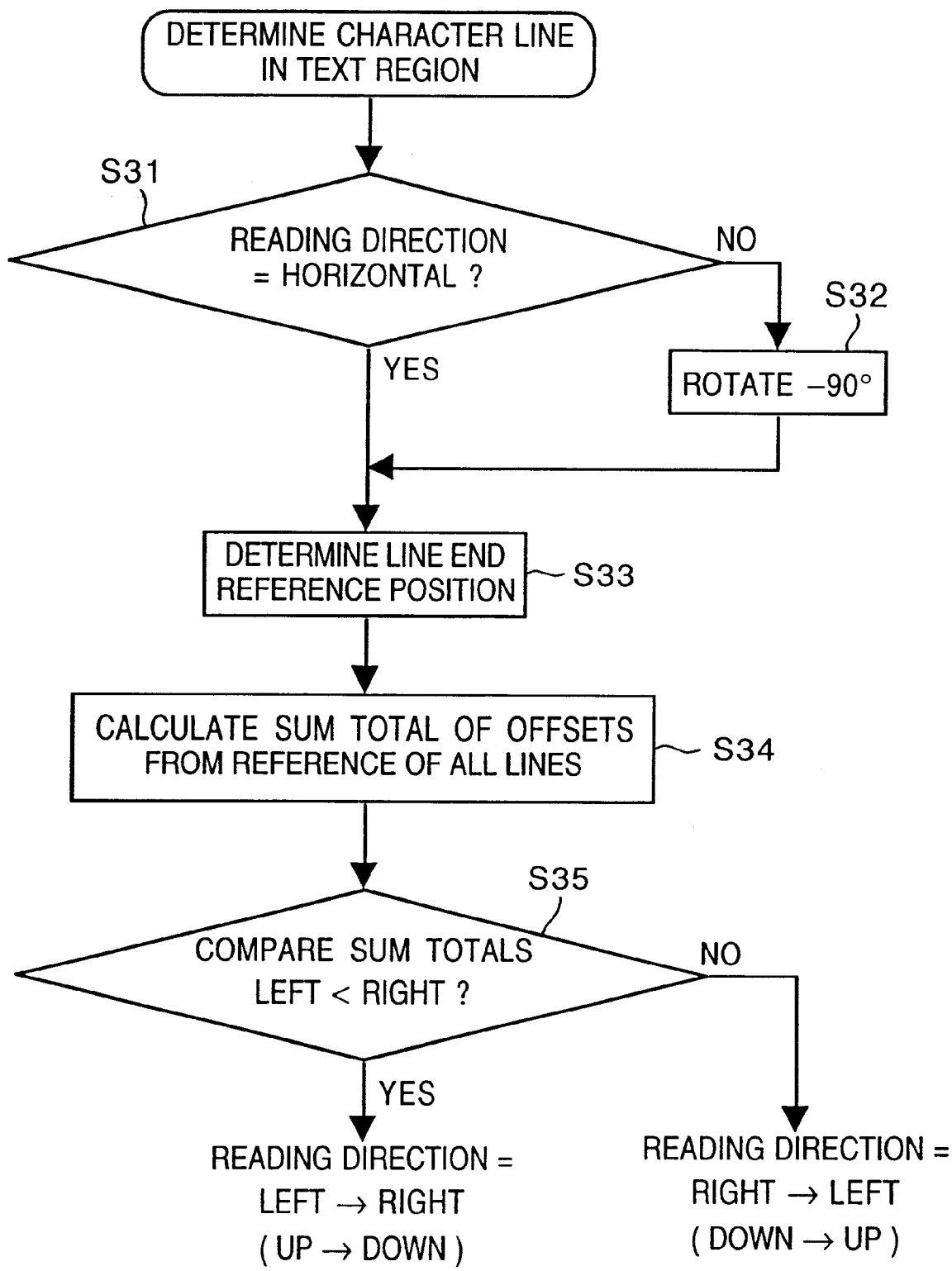
FIG. 40 is a flow chart showing the processing sequence for obtaining the reading direction of character lines by a direction extraction unit.

The direction extraction unit 4103-3 in the direction determination unit 4103 obtains the reading direction of character lines from a set of character lines in the text region. FIG. 40 is a flow chart showing the processing sequence for obtaining the reading direction of character lines by the direction extraction unit 4103-3.

Figure 37A:
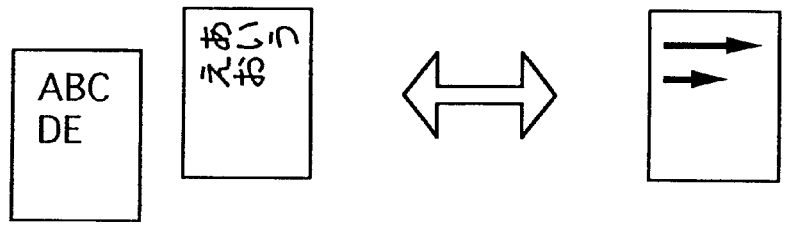
FIGS. 37A to 37D are views showing the relationship between different originals and the reading directions upon reading character lines on these originals.
Figure 37B:
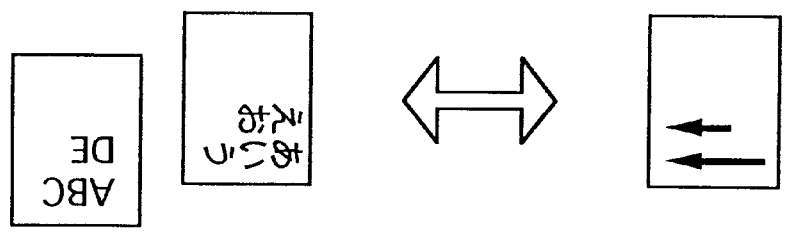
Figure 37C:
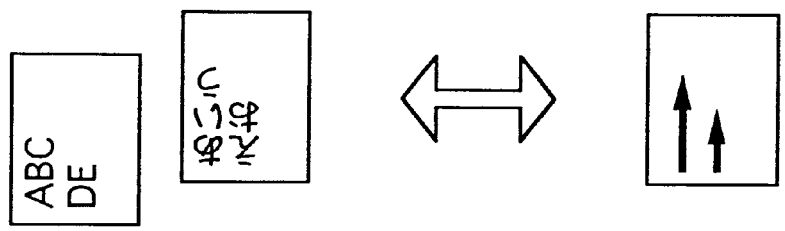
Figure 37D:
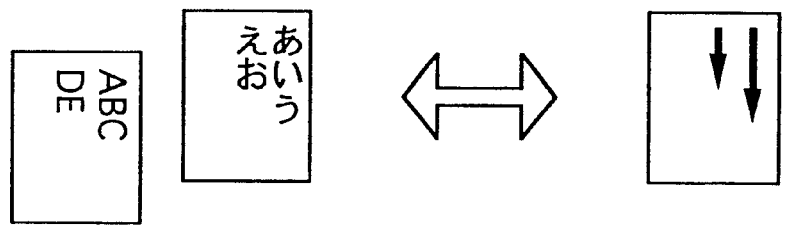

In step S31 in FIG. 40, it is checked if the reading direction is the vertical or horizontal direction, i.e., if the reading direction is the horizontal direction (widthwise direction), as shown in FIG. 37A or 37B, of the directions shown in FIGS. 37A to 37D, or is the vertical direction (longitudinal direction), as shown in FIG. 37C or 37D. The direction is determined based on the extending direction of the character lines, as described above. If it is determined in step S31 that the reading direction is the vertical direction, the coordinates of the rectangle circumscribing the character lines are rotated through −90° in step S32. The reason why the character lines are rotated is to execute the subsequent processing independently of the vertical or horizontal reading direction.

In the processing in steps S33 to S35 to be described in detail below, whether the horizontal reading direction points to the right or left (FIG. 37A or 37B), or whether the vertical reading direction points up or down (FIG. 37C or 37D) is determined in consideration of alignment of the line ends of character lines in the text region.

Figure 42:
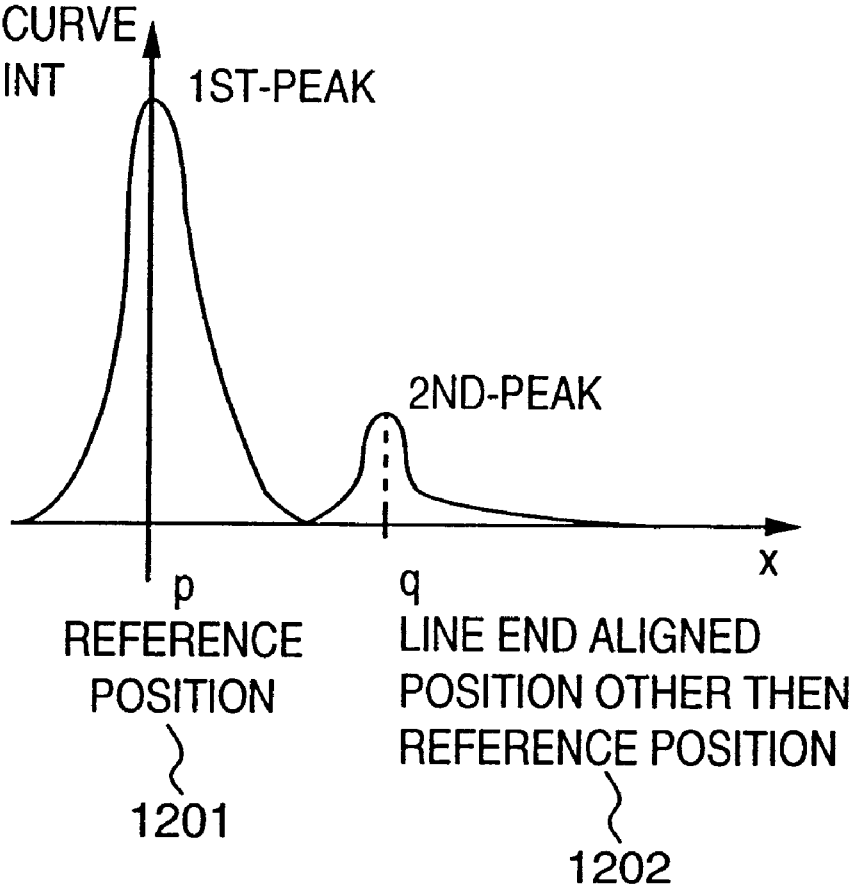
FIG. 42 is a graph showing an example of the distribution curve of the character line end points.

More specifically, in step S33, a reference position that represents an average line end position is determined on the basis of the distribution of line ends. For this purpose, as shown in FIG. 41, when an x-axis is set along the longitudinal direction of the character line, and the right and left directions are set for the x-axis, the distribution curve of the left end x-coordinate values of all the lines in the character region shown in FIG. 42 is obtained as a smoothed curve of a histogram having the number of lines as frequency. In this case, the x-coordinate that assumes a maximum, maximal value in the distribution curve is set to be the left reference position (a position denoted by reference numeral 1201 and corresponding to "1st-peak" in FIG. 42). A right reference position is similarly set.

As names corresponding to the reading direction of the character line, of the two ends of each line, the end at the beginning of reading will be called a start end, and the end at the end of reading will be called a terminal end. As can be seen from FIG. 41, the start ends at the beginning of lines are aligned well on the reference position, but since short lines at the divisions of paragraphs and the like are present on the terminal end side, and the terminal ends are not aligned at the reference position, many lines include blank portions from the line ends to the reference position. The length of such blank portion will be called an "offset", and in the sixth embodiment, the alignment of line ends is quantified and compared using a sum total of offsets, thereby determining if the reading direction is left to right or right to left. This processing will be described in detail below.

In step S34, the offsets at the line ends are converted into costs using a proper function, and sum totals of costs at the right and left ends are calculated. This cost function increases with the distance from the reference position to the line end. In the sixth embodiment, in order to suppress an unwanted increase in cost for a portion at the beginning of a paragraph on the left side of the text region shown in FIG. 41 and for a text region having a plurality of aligned lines at a position other than the reference position on the start end side (such as numbered lists or the like), the cost function is defined to reduce cost in the neighborhood of indented portions.

Note that alignment at a position other than the reference position is obtained as a coordinate value of a point corresponding to a second or subsequent maximal value ("2nd-peak" in FIG. 42) equal to or larger than a threshold value using the above-mentioned distribution function. This position corresponds to one denoted by reference numeral 1202 in FIG. 42.

In step S35, the right and left cost sum totals of all the lines are compared, and the side corresponding to a smaller sum total is determined to be the start end in the reading direction. In this case, the reading direction of character lines is determined to be the direction of start end to terminal end. More specifically, if the left cost sum total<the right cost sum total holds, the reading direction is determined to be left to right (up to down); if the left cost sum total>the right cost sum total holds, the reading direction is determined to be right to left (down to up). The directions in parentheses are reading directions when it is determined in step S31 that the reading direction is the vertical direction.

Figure 43:
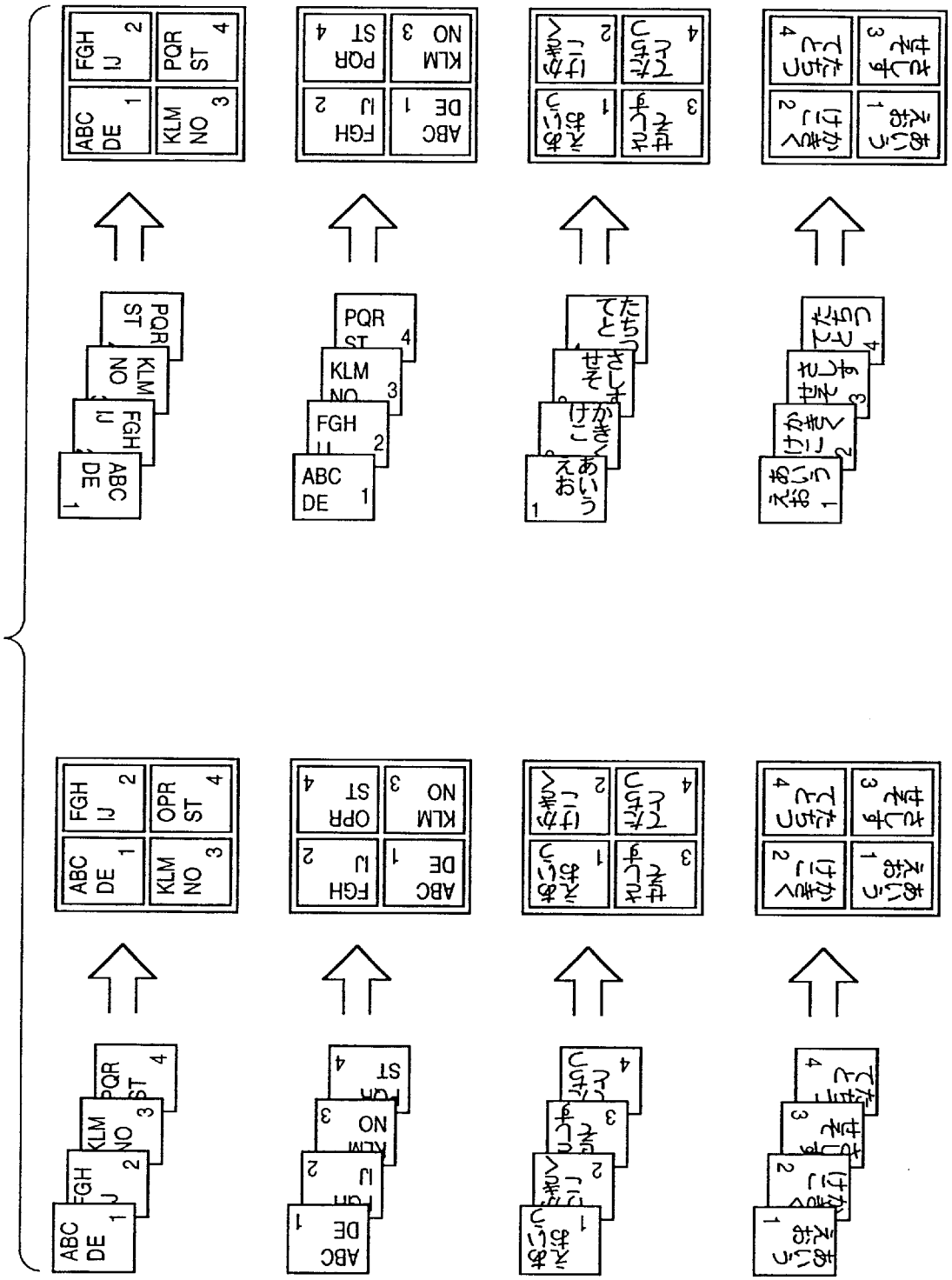
FIG. 43 is a view showing the copy results obtained when reduced-scale layout copying is done in the apparatus according to the sixth embodiment of the present invention.
Figure 44:
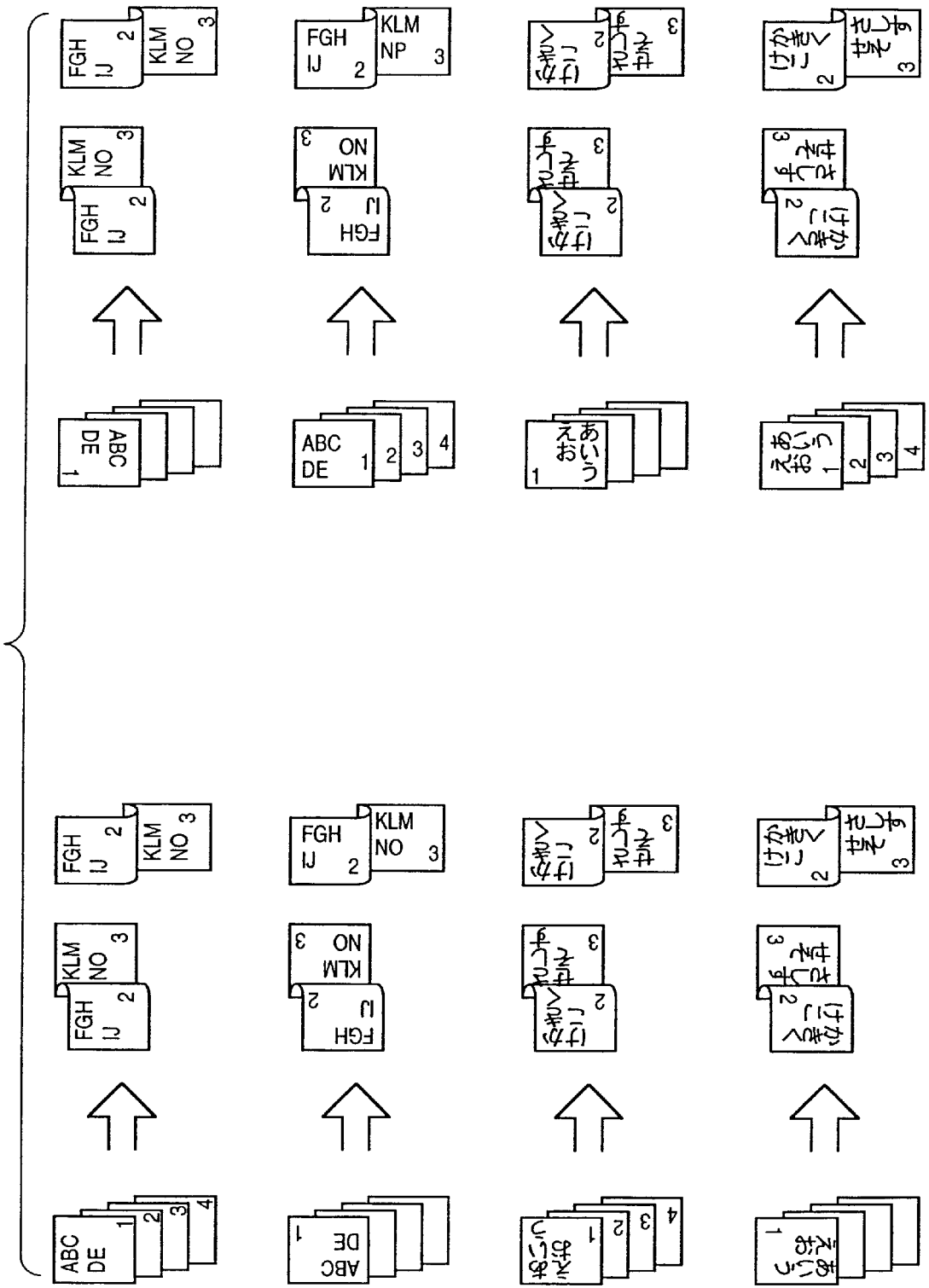
FIG. 44 is a view showing the output results upon executing a two-sided copying and stapling function in the apparatus according to the sixth embodiment of the present invention.

FIG. 43 shows copy results obtained when the reduced-scale layout copying is done in the apparatus according to the sixth embodiment that executes the above-mentioned processing. As shown in FIG. 43, reduced-scale layouts in correct directions can be obtained without being influenced by the types of originals and the directions of originals placed on the platen. FIG. 44 shows the output results obtained when the apparatus according to the sixth embodiment executes the two-sided copying and stapling mode. In this case, again, stapled two-sided copies in correct directions can be obtained without being influenced by the types of originals and the directions of originals placed on the platen.

As described above, according to the sixth embodiment, a text region is extracted from an image signal obtained by reading an original, and an image is output in accordance with the reading direction, which is obtained by comparing alignments of the right and left line ends of character lines in consideration of the layout of character lines in the text region. In this manner, a natural reduced-scale layout and stapled two-sided copies can be obtained independently of the placing direction of originals on the platen.

Upon determination of the reading direction, the difference between a Japanese vertically written document and a horizontally written document common to Japanese and English is absorbed by checking the reading direction of character lines. For this reason, the top and bottom of each character on the original need not be perfectly detected, and direction determination can be implemented by a smaller memory capacity than character recognition.

Modification

In the sixth embodiment described above, each original has a single text region. When a plurality of text regions are extracted from a single original, the following processing may be made to determine a highly probable direction.

Figure 45:
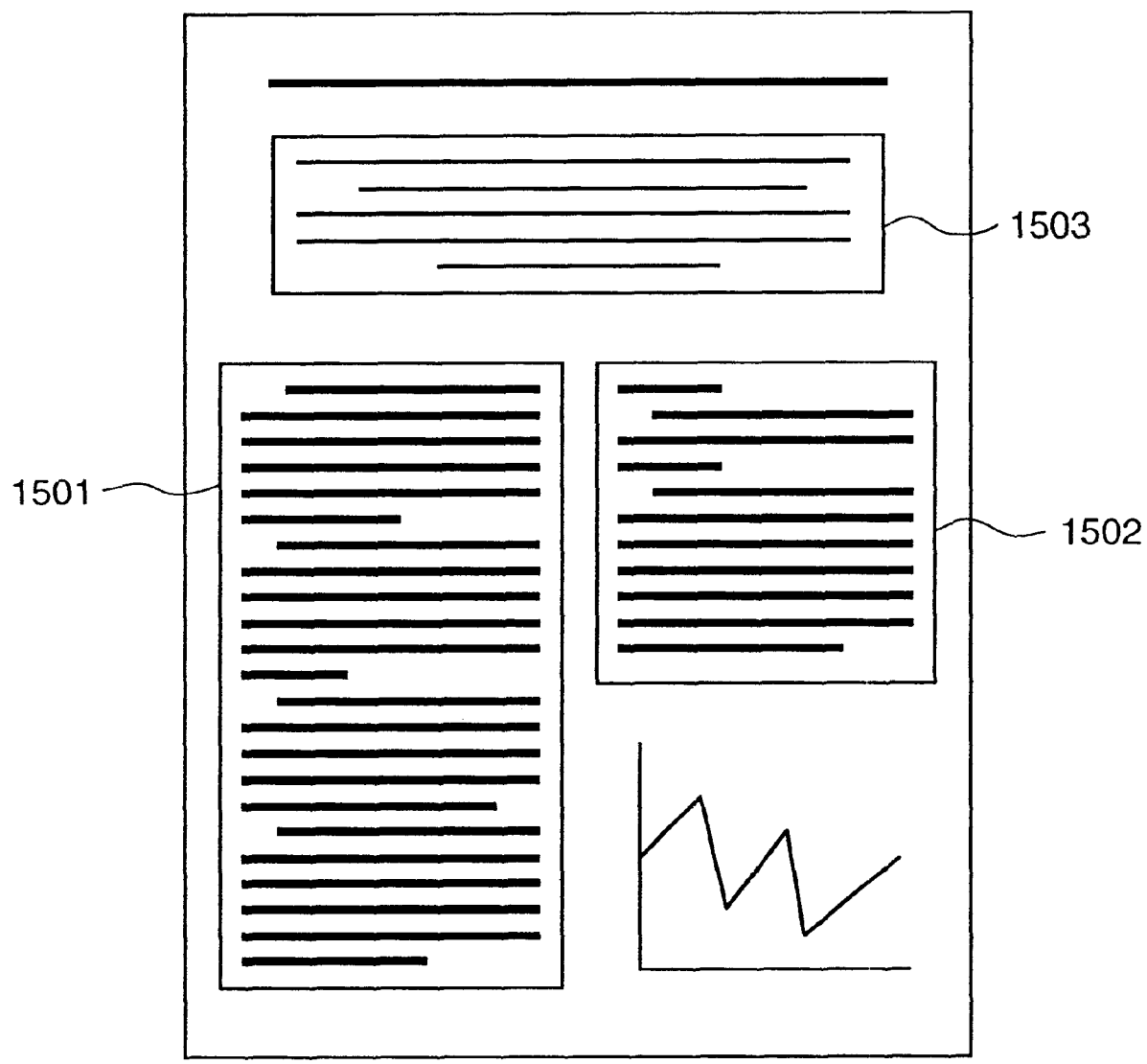
FIG. 45 is a view showing an example of an original with a plurality of text regions.

FIG. 45 shows an example of an original having a plurality of text regions 1501 to 1503. In this case, the directions of the plurality of text regions are independently determined to obtain results in units of regions. These results are weighted in correspondence with the numbers of character lines, the areas of the regions, and the positions of the text regions in the original, and the direction of the entire original is determined based on these weighted results.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus, comprising:
   acquire means for acquiring first information about character directions of a plurality of original images for layout on a single sheet and second information about writing directions of characters of the plurality of original images for layout on the single sheet;
   layout means for laying out the plurality of original images on a single sheet;
   control means for controlling said layout means to determine a layout order and directions of the plurality of original images for layout on said single sheet on the basis of the first and second information acquired by said acquiring means; and
   wherein said control means further comprises storage control means for controlling storage of the first and second information to be associated with the original image for layout on the single sheet,
   said control means for determining the layout order and directions of the plurality of original images for layout on the single sheet on the basis of the first and second information associated with the original image for layout on the single sheet and stored by said storage controlling means.

2. The apparatus according to claim 1, further comprising:
   first memory means for holding image signals obtained by converting the original images; and
   second memory means for holding the first and second information acquired by said acquire means to be associated with image signals in the first memory by said storage controlling means.

3. The apparatus according to claim 2, further comprising:
   compression means for compressing the image signals; and
   expansion means for expanding the image signals compressed by said compression means, and
   wherein said first memory means holds the image signals compressed by said compression means, and
   said control means controls said layout means to change a layout order and directions of the plurality of original images using image signals obtained by reading out the compressed image signals from said first memory means and expanding the readout image signals by said expansion means, on the basis of the first and second information acquired by said acquire means.

4. The apparatus according to claim 1, wherein said first information is one of up, down, right, and left directions of the original image.

5. The apparatus according to claim 1, wherein said second information is one of vertical and horizontal writing directions of characters of the original image.

6. The apparatus according to claim 1, further comprising:
   selection means for selecting a first mode for acquiring the first and second information by an operator setting or a second mode for acquiring the first and second information by automatic determination of the character direction and the writing direction.

7. The apparatus according to claim 1, further comprising forming means for forming the plurality of original images on the single sheet under the control of said control means.

8. The apparatus according to claim 7, wherein said forming means forms the plurality of original images on one surface of the single sheet.

9. The apparatus according to claim 7, wherein said forming means forms the plurality of original images on two surfaces of the single sheet under the control of said control means.

10. The apparatus according to claim 7, wherein said forming means forms a binding margin and the plurality of original images on the single sheet under the control of said control means.

11. The apparatus according to claim 4, wherein said forming means forms a stapling position and the plurality of original images on the single sheet under the control of said control means.

12. The apparatus according to claim 1, wherein said acquire means comprises determination means for determining character directions of the plurality of original images, and writing directions of characters of the plurality of original images, and
    when execution of determination of said determination means is designated, said determination means separates character regions enclosed in rectangles from the original image by calculating histograms in the vertical and horizontal directions, extracts a plurality of characters included in the character regions, performs character recognition of each character from a plurality of directions, and determines a direction with a highest degree of recognition as the character direction of the original image and the writing directions of characters of the original image on the basis of the result of separation.

13. An image processing method, comprising:
    acquiring first information about character direction of a plurality of original images for layout on a single sheet and second information about writing directions of characters of the plurality of original images for layout on a single sheet;
    laying at the plurality of original images on a single sheet;
    controlling said laying out to determine a layout order and directions of the plurality of original images for layout on said single sheet on the basis of the first and second information acquired; and
    wherein said controlling step further comprises controlling storage of the first and second information to be associated with the original image for layout on the single sheet,
    said controlling step for determining the layout order and directions of the plurality of original images for layout on the single sheet on the basis of the stored first and second information associated with the original image for layout on the single sheet.

14. The method according to claim 13, further comprising:
    the first holding step of converting the original images into image signals and holding the image signals in first memory means; and
    the second holding step of holding the first and second information acquired to be associated with image signals in the first memory by said storage controlling means.

15. The method according to claim 14, further comprising:
    the compression step of compressing the image signals; and
    the expansion step of expanding the image signals compressed in the compression step, and
    wherein the first holding step includes the step of holding the image signals compressed in the compression step in said first memory means, and the control step includes changing a layout order and directions of the plurality of original images using image signals obtained by reading out the compressed image signals from said first memory means and expanding the readout image signals in the expression step, on the basis of the first and second information acquired.

16. The method according to claim 13, wherein the first information is one of up, down, right, and left directions of the original image.

17. The method according to claim 13, wherein the second information is one of vertical and horizontal writing directions of the original image.

18. The method according to claim 13, further comprising:

a selection step of selecting a first mode for acquiring the first and second information by an operator setting or a second mode for acquiring the first and second information by automatic determination of the character direction and the writing direction.

19. The method according to claim 13, further comprising the forming step of forming the plurality of original images on the single sheet under the control of the control step.

20. The method according to claim 19, wherein said forming step forms the plurality of original images on one surface of the single sheet.

21. The method according to claim 19, wherein the forming step includes the step of forming the plurality original images on two surfaces of the single sheet under the control of the control step.

22. The method according to claim 19, wherein the forming step includes the step of forming a binding margin and the plurality of original images on the single sheet under the control of the control step.

23. The method according to claim 19, wherein the forming step includes the step of forming a stapling position and the plurality of original images on the single sheet under the control of the control step.

24. The method according to claim 13, wherein the acquiring step comprises the determination step of determining character directions of the plurality of original images and writing directions of characters of the plurality of original images, and when execution of determination in the determination step is designated, the determination step separates character regions enclosed in rectangles from the original image by calculating histograms in the vertical and horizontal directions, and includes the step of extracting a plurality of characters included in the character region, performing character recognition of each character from a plurality of directions, and determining a direction with a highest degree of recognition as the character direction of the original image and the writing directions of characters of the original image on the basis of the result of separation.

25. A computer readable memory that stores a program code of image processing, comprising the steps of:

acquiring first information about character direction of a plurality of original images for layout on a single sheet and second information about writing directions of characters of the plurality of original images for layout on a single sheet;

laying out the plurality of original images on a single sheet;

controlling said laying out to determine a layout order and directions of the plurality of original images for layout on said single sheet on the basis of the first and second information acquired; and wherein said controlling step further comprises controlling storage of the first and second information to be associated with the original image for layout on the single sheet, said controlling step for determining the layout order and directions of the plurality of original images for layout on the single sheet on the basis of the stored first and second information associated with the original image for layout on the single sheet.

* * * * *

UNITED STATES PATENT AND TRADEMARK OFFICE
CERTIFICATE OF CORRECTION

PATENT NO. : 6,473,196 B2
DATED : October 29, 2002
INVENTOR(S) : Akihiro Usami et al.

It is certified that error appears in the above-identified patent and that said Letters Patent is hereby corrected as shown below:

Column 18,
Line 23, "form" should read -- from --.

Column 19,
Line 7, "M1=-Kxlog10(G/155)" should read -- M1=-Kxlog10(g/255) --.

Column 26,
Line 35, "at" should read -- out --.

Signed and Sealed this

Eighteenth Day of March, 2003

JAMES E. ROGAN
*Director of the United States Patent and Trademark Office*